United States Patent
Yu et al.

(10) Patent No.: US 11,106,321 B2
(45) Date of Patent: *Aug. 31, 2021

(54) TOUCH PANEL AND MANUFACTURING METHOD THEREFOR

(71) Applicant: TPK Glass Solutions (Xiamen) Inc., Xiamen (CN)

(72) Inventors: Chien-Hsien Yu, Zhubei (TW); Fang Fang, Xiamen (CN); Yipeng Gan, Xiamen (CN); Wei-Na Cao, Fujian (CN); Zheng-pang Huang, Fujian Province (CN)

(73) Assignee: TPK Glass Solutions (Xiamen) Inc., Xiamen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/824,754

(22) Filed: Mar. 20, 2020

(65) Prior Publication Data
US 2020/0319751 A1 Oct. 8, 2020

(30) Foreign Application Priority Data

Mar. 22, 2019 (CN) .......................... 201910222664.5

(51) Int. Cl.
G06F 3/041 (2006.01)
G06F 3/044 (2006.01)
G06F 3/047 (2006.01)
G03F 7/32 (2006.01)

(52) U.S. Cl.
CPC ............ *G06F 3/0443* (2019.05); *G06F 3/047* (2013.01); *G06F 2203/04103* (2013.01); *G06F 2203/04112* (2013.01)

(58) Field of Classification Search
CPC ................... G06F 3/0443; G06F 3/047; G06F 2203/04112; G06F 2203/04103
See application file for complete search history.

(56) References Cited

U.S. PATENT DOCUMENTS

| | | | |
|---|---|---|---|
| 2005/0153107 A1* | 7/2005 | Iijima | ............... B32B 17/10174 428/195.1 |
| 2013/0040238 A1* | 2/2013 | Chen | ...................... C09J 133/14 430/271.1 |
| 2016/0246415 A1* | 8/2016 | Bae | ........................ G06F 3/0445 |
| 2016/0320874 A1* | 11/2016 | Park | ...................... G06F 3/0443 |
| 2018/0196561 A1* | 7/2018 | Kim | ........................ G06F 3/0445 |

* cited by examiner

*Primary Examiner* — Md Saiful A Siddiqui
(74) *Attorney, Agent, or Firm* — Cooper Legal Group, LLC

(57) ABSTRACT

A manufacturing method for a touch panel includes defining a removing area of a photo-sensitive conductive layer and a photo-sensitive layer by an exposure process. On a display area, the photo-sensitive layer and a metal nanowire layer in the removing area are removed by a developer solution so as to form a touch sensing electrode on the display area. On a peripheral area, the photo-sensitive conductive layer, the photo-sensitive layer, and the metal nanowire layer in the removing area are removed by the developer solution so as to form a peripheral trace on the peripheral area. The touch sensing electrode and the peripheral trace are electrically connected with each other.

22 Claims, 20 Drawing Sheets

TOUCH PANEL AND MANUFACTURING METHOD THEREFOR

CROSS REFERENCE TO RELATED APPLICATIONS

This Non-provisional application claims priority under 35 U.S.C. § 119(a) to Patent Application No. 201910222664.5, filed in People's Republic of China on Mar. 22, 2019, the entire contents of which are hereby incorporated by reference.

BACKGROUND

Technology Field

This disclosure relates to a touch panel and a manufacturing method therefor.

Description of Related Art

Since transparent conductors are light permeable and have proper electrical conductivity, they are commonly used in many display or touch devices. Conventionally, the transparent conductors can be made of a metal oxide film layer, such as ITO (indium tin oxide), IZO (indium zinc oxide), CTO (cadmium tin oxide), or AZO (aluminum-doped zinc oxide). In some circumstances, the metal oxide film layer, when patterned, can be observed by the viewer of the display. In addition, the metal oxide film layer is not flexible. Therefore, various transparent conductors, such as transparent conductors made of nanowires, have been developed.

However, when utilizing nanowires to manufacture the touch electrode, there are many issues that need to be solved regarding the manufacturing process and structure between the nanowires and the metal trace on the peripheral area. For example, the conventional manufacturing process is to apply the nanowire on the display area and the peripheral area for covering the metal trace on the peripheral area, and then to pattern the nanowire by an etching solution to form the touch sensing electrode on the display area. The above manufacturing process usually adopts a strong acid etching solution, which may also etch the metal trace and thus decrease the product reliability. Besides, the residual etching solution needs to be cleaned by an additional cleaning process. Moreover, the patterning procedures of the nanowire layer and the metal trace need two photolithography processes and two etching processes, so the total manufacturing process is more complicated. In addition, the touch sensing electrode and the metal trace must be aligned, but the alignment process must consider the alignment tolerance and the expansion and contraction of the substrate. Thus, the alignment tolerance space must be preserved, so the border of the touch panel cannot be further narrowed, and the product may not satisfy the narrow border requirement.

In addition, the contact impedance between the nanowire layer and the metal trace is too large, which can affect the performance of the touch panel.

Therefore, in the manufacturing process utilizing the nanowire to form the touch sensing electrode, the electrode structure must be redesigned based on the material property, thereby achieving a better product performance.

SUMMARY

Some embodiments of this disclosure can improve the manufacturing efficiency/production yield of the touch panel, and the touch panel can have the property of low impedance.

Some embodiments of this disclosure provides a manufacturing method for a touch panel, which comprises the steps of: providing a substrate, wherein the substrate comprises a display area and a peripheral area; forming a photo-sensitive conductive layer on the peripheral area; forming a metal nanowire layer on the display area and the peripheral area, wherein the metal nanowire layer comprises metal nanowires, and a part of the metal nanowire layer covers the photo-sensitive conductive layer; forming a photo-sensitive layer on the metal nanowire layer; and performing a patterning process for: exposing the photo-sensitive layer and the photo-sensitive conductive layer to define a first removing area and a second removing area; and removing the photo-sensitive layer and the metal nanowire layer in the first removing area by a developer solution so as to form a touch sensing electrode on the display area, and simultaneously removing the photo-sensitive conductive layer, the photo-sensitive layer and the metal nanowire layer in the second removing area by the developer solution so as to form a peripheral conductive trace on the peripheral area, wherein the touch sensing electrode is electrically connected with the peripheral conductive trace, and the touch sensing electrode at least comprises the metal nanowires.

In some embodiments of this disclosure, the photo-sensitive conductive layer comprises a negative photo-sensitive silver paste.

In some embodiments of this disclosure, the manufacturing method further comprises a step of pre-curing/curing the silver paste.

In some embodiments of this disclosure, the photo-sensitive layer and the photo-sensitive conductive layer are made of materials with same bandwidth absorption characteristics, and the step of exposing the photo-sensitive layer and the photo-sensitive conductive layer comprises to provide a light source for simultaneously exposing the photo-sensitive layer and the photo-sensitive conductive layer.

In some embodiments of this disclosure, after the patterning process, the manufacturing method further comprises a step of completely removing the metal nanowires in the first removing area or the second removing area by an adhesion method.

In some embodiments of this disclosure, a thickness of the photo-sensitive layer is configured to at least cover the metal nanowires.

In some embodiments of this disclosure, the steps of forming the metal nanowire layer on the display area and the peripheral area, and forming the photo-sensitive layer on the metal nanowire layer comprise: attaching a composite film, which at least comprises the photo-sensitive layer and the metal nanowire layer, on the substrate.

Some embodiments of this disclosure provides a manufacturing method for a touch panel, which comprises the steps of: providing a substrate, wherein the substrate comprises a display area and a peripheral area, and a first axial electrode is configured on the display area; forming a photo-sensitive layer, a metal nanowire layer comprising metal nanowires, and a photo-sensitive conductive layer on the substrate; and performing a patterning process for: exposing the photo-sensitive layer and the photo-sensitive conductive layer to define a first removing area and a second removing area; and removing the photo-sensitive layer and the metal nanowire layer in the first removing area by a developer solution so as to form a second axial electrode on the display area; and simultaneously removing the photo-sensitive conductive layer, the photo-sensitive layer and the metal nanowire layer in the second removing area by the developer solution so as to form a peripheral conductive trace on the peripheral area, wherein the first axial electrode and the second axial electrode are isolated from each other, the first axial electrode and the second axial electrode are electrically connected with the peripheral conductive trace, and the first axial electrode and the second axial electrode at least comprise the metal nanowires.

In some embodiments of this disclosure, the step of forming the photo-sensitive layer, the metal nanowire layer comprising the metal nanowires, and the photo-sensitive conductive layer on the substrate comprises: forming the photo-sensitive layer on the substrate; forming the metal nanowire layer on the photo-sensitive layer, wherein a first part of the metal nanowire layer is located on the display area, and a second part of the metal nanowire layer is located on the peripheral area; and forming the photo-sensitive conductive layer on the peripheral area, wherein the photo-sensitive conductive layer covers the second part.

In some embodiments of this disclosure, the photo-sensitive conductive layer comprises a negative photo-sensitive silver paste.

In some embodiments of this disclosure, the manufacturing method further comprises a step of pre-curing/curing the silver paste.

In some embodiments of this disclosure, the photo-sensitive layer and the photo-sensitive conductive layer are made of materials with same bandwidth absorption characteristics, and the step of exposing the photo-sensitive layer and the photo-sensitive conductive layer comprises to provide a light source for simultaneously exposing the photo-sensitive layer and the photo-sensitive conductive layer.

In some embodiments of this disclosure, after the patterning process, the manufacturing method further comprises a step of removing the metal nanowires in the first removing area or the second removing area by an adhesion method.

In some embodiments of this disclosure, a thickness of the photo-sensitive layer is configured to at least cover the metal nanowires.

In some embodiments of this disclosure, a non-conductive area is provided between one peripheral conductive trace and another peripheral conductive trace, and the concentration of the metal nanowires in the non-conductive area is zero.

In some embodiments of this disclosure, the step of forming the photo-sensitive layer, the metal nanowire layer comprising the metal nanowires, and the photo-sensitive conductive layer on the substrate comprises: attaching a composite film, which at least comprises the photo-sensitive layer and the metal nanowire layer, on the substrate; and forming the photo-sensitive conductive layer on the peripheral area.

Some embodiments of this disclosure provides a touch panel, which comprises: a substrate, wherein the substrate comprises a display area and a peripheral area; a first axial electrode formed on the display area, wherein the first axial electrode comprises a photo-sensitive layer and a metal nanowire layer formed on the substrate; and a photo-sensitive conductive layer formed on the peripheral area, wherein the photo-sensitive layer and the photo-sensitive conductive layer are exposed to define a first removing area and a second removing area, the photo-sensitive layer and the metal nanowire layer in the first removing area are removed by a developer solution so as to form a second axial electrode on the display area, the photo-sensitive conductive layer, the photo-sensitive layer and the metal nanowire layer in the second removing area are removed by the developer solution so as to form a peripheral conductive trace on the peripheral area, the first axial electrode and the second axial electrode are isolated from each other, the first axial electrode and the second axial electrode are electrically connected with the peripheral conductive trace, and the first axial electrode and the second axial electrode at least comprise metal nanowires.

In some embodiments of this disclosure, the metal nanowire layer comprises metal nanowires, the metal nanowires are embedded in the photo-sensitive layer to form a conductive network, and the photo-sensitive layer and the metal nanowires located on the display area together form the second axial electrode.

In some embodiments of this disclosure, the first axial electrode comprises a connecting electrode, the second axial electrode comprises a bridging electrode, and the photo-sensitive layer forms an isolation layer between the connecting electrode and the bridging electrode.

In some embodiments of this disclosure, a non-conductive area is provided between one peripheral conductive trace and another peripheral conductive trace, and the concentration of the metal nanowires in the non-conductive area is less than a percolation threshold, so that the metal nanowires in the non-conductive area form a non-conductive network.

In some embodiments of this disclosure, the touch sensing electrode has an exposed sidewall.

In some embodiments of this disclosure, the peripheral conductive trace is disposed on a composite structure comprising the photo-sensitive layer and the metal nanowire layer, the peripheral conductive trace has a first exposed sidewall, the composite structure has a second exposed sidewall, and the first exposed sidewall and the second exposed sidewall are aligned to form a coplanar surface.

BRIEF DESCRIPTION OF THE DRAWINGS

The disclosure will become more fully understood from the detailed description and accompanying drawings, which are given for illustration only, and thus are not limitative of the present disclosure, and wherein.

DETAILED DESCRIPTION OF THE DISCLOSURE

Figure 1:
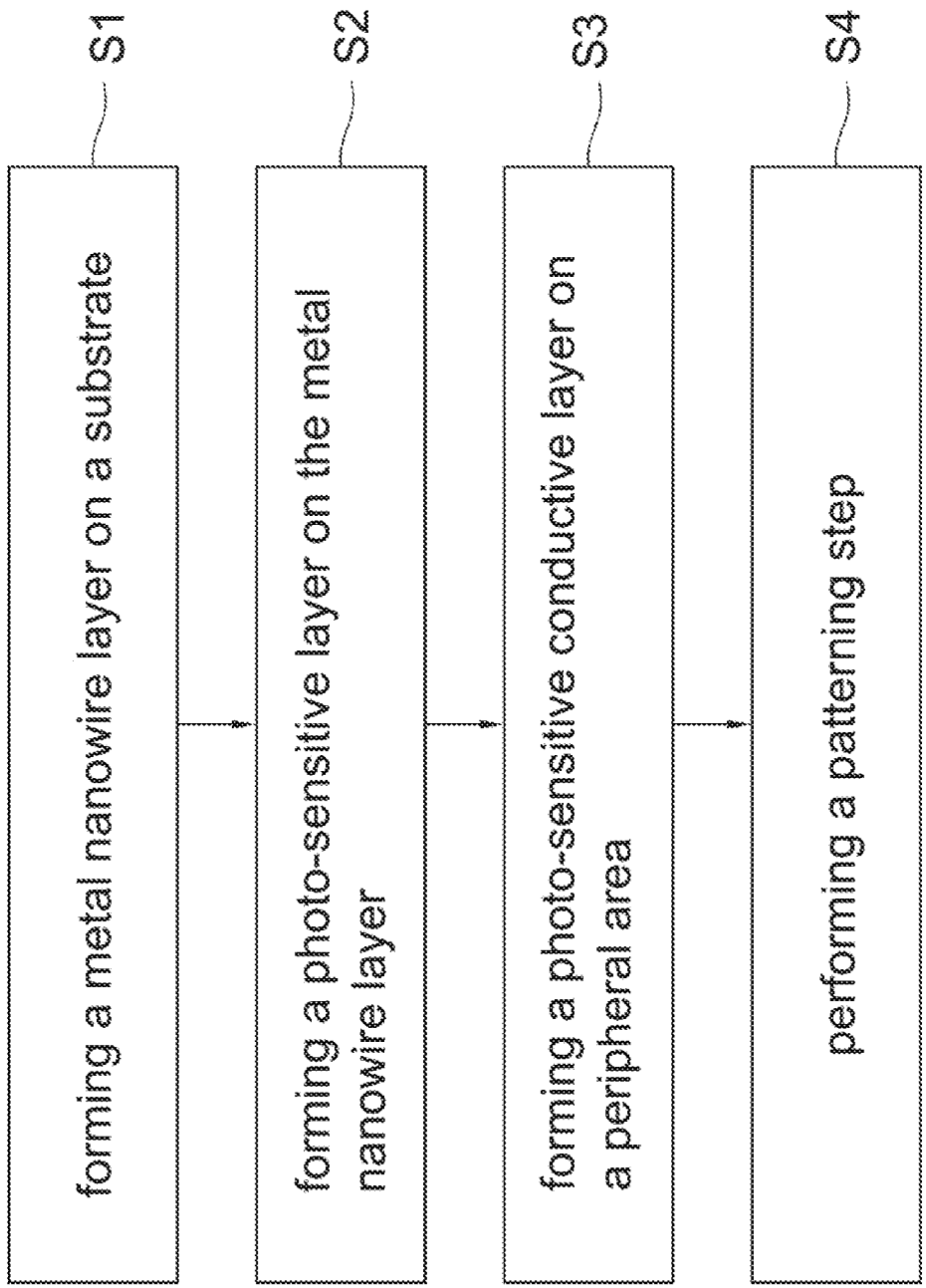
FIG. 1 is a flow chart of a manufacturing method for a touch panel according to some embodiments of this disclosure.

The present disclosure will be apparent from the following detailed description, which proceeds with reference to the accompanying drawings, wherein the same references relate to the same elements.

The various embodiments of the present disclosure are illustrated in the drawings, and the practical details will be described in the following embodiments. However, it should be understood that these practical details are not intended to limit the disclosure. That is, in some embodiments of the disclosure, these practical details are not necessary. In addition, some of the conventional structures and elements are shown in the drawings in a simplified manner.

As used herein, "about" or "rough" is generally an error or a range within 20% of a value, preferably a range within 10%, and more preferably a range within 5%. Unless otherwise stated, the numerical values mentioned in this disclosure are considered as approximations, that is, they have an error or a range as indicated by "about" or "rough". In addition, "metal nanowire" and "metal nanowire layer" are the same or similar components, which will be alternately used in the following description.

Figure 2:
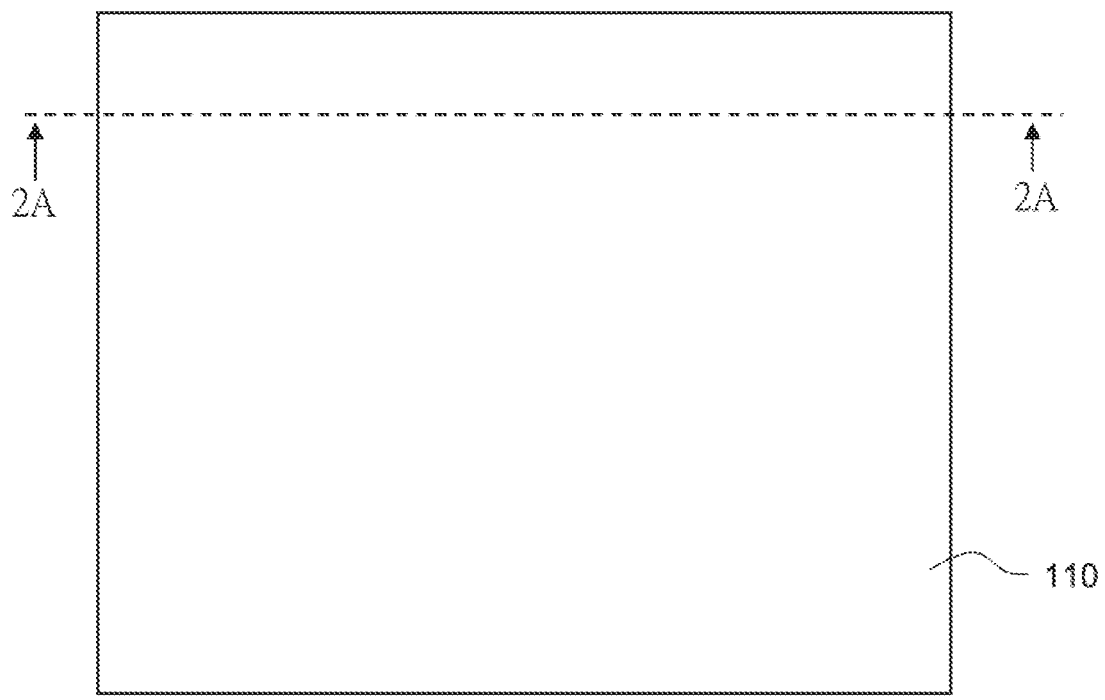
FIG. 2 is a top view of the substrate according to some embodiments of this disclosure.
Figure 2A:
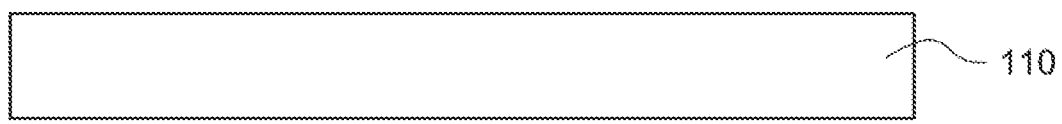
FIG. 2A is a sectional view of FIG. 2 along the line 2A-2A.

FIG. 1 is a flow chart of a manufacturing method for a touch panel according to some embodiments of this disclosure. The manufacturing method of this embodiment includes the following steps. First, referring to FIGS. 2 and 2A, a substrate 110 is provided. In some embodiments of this disclosure, the substrate 110 is ideally a transparent substrate. Specifically, the substrate 110 can be a rigid transparent substrate or a flexible transparent substrate, and the material thereof can be selected from any of the transparent materials including glass, polymethylmethacrylate (PMMA), polyvinyl chloride (PVC), polypropylene (PP), polyethylene terephthalate (PET), polyethylene naphthalate (PEN), polycarbonate (PC), and polystyrene (PS).

Figure 3:
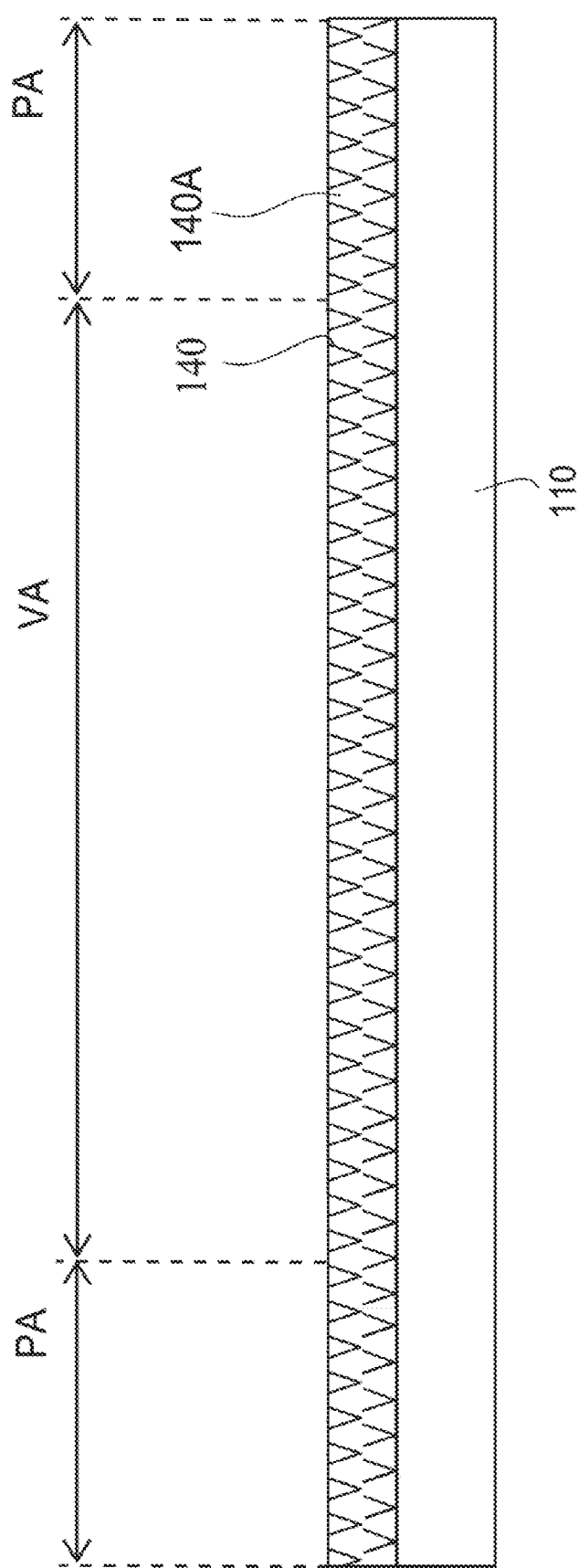
FIG. 3 is a schematic diagram showing the step S1 of the manufacturing method of FIG. 1.

Next, referring to FIG. 3, the step S1 is to form a metal nanowire layer 140A on the substrate 110. The metal nanowire layer 140A can be at least formed by metal nanowires 140. Specifically, a dispersion solution or an ink containing the metal nanowires 140 is coated on the substrate 110, and the metal nanowires 140 can be coated on the surface of the substrate 110 after the drying process. In other words, after the drying (curing) process, the metal nanowires 140 can form the metal nanowire layer 140A on the substrate 110. The substrate 110 can be defined with a display area VA and a peripheral area PA, and the peripheral area PA is disposed at one or more sides of the display area VA. For example, as shown in FIG. 3, the peripheral area PA can be disposed at the left side and the right side of the display area VA. In other embodiments, the peripheral area PA can be disposed at four sides of the display area VA (e.g. the top side, the bottom side, the left side, and the right side) or two adjacent sides (with an L shape) of the display area VA. The metal nanowire layer 140A may comprise a first part formed on the display area VA and a second part formed on the peripheral area PA. In more detail, in the display area VA, the first part of the metal nanowire layer 140A can be directly formed on the surface of the substrate 110. Similarly, in the peripheral area PA, the second part of the metal nanowire layer 140A can be formed on the surface of the substrate 110.

In some embodiments of this disclosure, the dispersion solution can comprise a solvent, such as water, alcohol, ketone, ether, hydrocarbon, or aromatic solvent (e.g. benzene, toluene, xylene, etc.). The dispersion solution may also comprise additives, interface active agents, or binders, such as carboxymethyl cellulose (CMC), 2-hydroxyethyl cellulose (HEC), hydroxypropyl methylcellulose (HPMC), sulfonic acid ester, sulfate, disulfonate, sulfosuccinate, phosphate or fluorosurfactant, and the likes. The metal nanowire layer 140A may be, for example, a silver nanowire layer, a gold nanowire layer, or a copper nanowire layer. In more detail, the term "metal nanowire" as used herein is a collective term of metal wire that refers to a plurality of elemental metals, metal alloys, or metal compounds (including metal oxides), wherein the number of metal nanowires contained therein does not affect the claimed range. In addition, at least one cross-sectional dimension of a single metal nanowire (i.e. the diameter of the cross-section) is less than 500 nm, preferably less than 100 nm, and more preferably less than 50 nm. The metal nanostructure of the "wire" in this disclosure mainly has a high aspect ratio, for example, between 10 and 100,000. Specifically, the aspect ratio (length:diameter of the cross-section) of the metal nanowire may be greater than 10, preferably greater than 50, and more preferably greater than 100. The metal nanowires 140 may be made of any metal including, for example but not limited to, silver, gold, copper, nickel, and gold-plated silver. Other terms, such as silk, fiber, tube, etc., which also have the above-mentioned dimensions and high aspect ratios, are also within the scope of the present disclosure.

The dispersion solution or ink containing the metal nanowires 140 can be formed on the surface of the substrate 110 by any method such as, for example but not limited to, screen printing, nozzle coating, roller coating, etc. In one embodiment, a roll to roll process can be used to apply the dispersion solution or ink containing the metal nanowires 140 to the surface of a continuously supplied substrate 110.

In some embodiments of this disclosure, the metal nanowires 140 can be silver nanowires or silver nanofibers having an average diameter of about 20-100 nm and an average length of about 20-100 μm, and preferably an average diameter of about 20-70 nm and an average length of about 20-70 μm. That is, the aspect ratio thereof is 1000. In some embodiments, the diameter of the metal nanowires 140 are between 70 nm and 80 nm, and the length thereof is about 8 μm.

Figure 4:
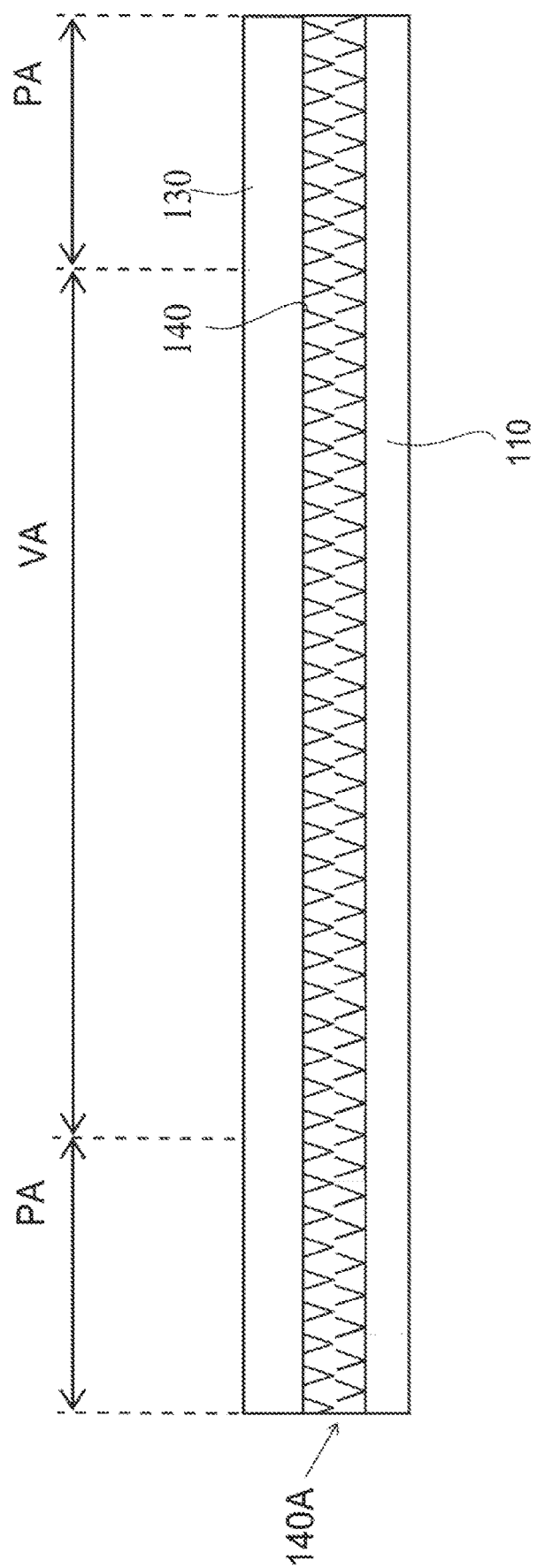
FIG. 4 is a schematic diagram showing the step S2 of the manufacturing method of FIG. 1.

Next, referring to FIG. 4, the step S2 is to form a photo-sensitive layer 130 on the metal nanowire layer 140A. Specifically, a proper polymer or a mixture thereof is coated on the substrate 110, and then a curing step (or a drying step) is performed to form the photo-sensitive layer 130 on the metal nanowire layer 140A. In more detail, the photo-sensitive layer 130 comprises a first part formed on the display area VA and a second part formed on the peripheral area PA. The first part of the photo-sensitive layer 130 can be correspondingly formed on the first part of the metal nanowire layer 140A, and the second part of the photo-sensitive layer 130 can be correspondingly formed on the second part of the metal nanowire layer 140A. In another embodiment, a proper polymer or a mixture thereof is coated on the substrate 110, so that the polymer can penetrate into the space between the metal nanowires 140 to form a filler. Then, a curing step is performed to form the photo-sensitive layer 130. In other words, the metal nanowires 140 are embedded in the photo-sensitive layer 130. In one specific embodiment, the curing step comprises heating or baking the above-mentioned polymer or mixture (at a temperature of about 60-150° C.) to form the photo-sensitive layer 130 on the metal nanowire layer 140A. The physical structure of the photo-sensitive layer 130 and the metal nanowire layer 140A is not limited in this disclosure. For example, the photo-sensitive layer 130 and the metal nanowire layer 140A can be two stacked structures, or the photo-sensitive layer 130 and the metal nanowire layer 140A can be combined to form a composite layer. Preferably, the metal nanowires 140 are embedded into the photo-sensitive layer 130 to form a composite electrode layer in the following process (the following described composite structure). For the sake of a clear description, FIG. 4 does not show the composite structure in which the photo-sensitive layer 130 penetrates into the space between the metal nanowires 140.

In one embodiment, the photo-sensitive layer 130 is formed by a photo-sensitive resin, and the photo-sensitive layer 130 can be patterned by an exposure process. Specifically, the photo-sensitive layer 130 can be made of a negative photo-sensitive photoresist material. In another embodiment, the photo-sensitive layer 130 can be made of a positive photo-sensitive photoresist material.

In one embodiment, the photo-sensitive layer 130 can be made of the polymer such as, for example but not limited to, polyacrylic resins such as polymethacrylate (e.g. poly(methyl methacrylate)), polyacrylate, and polyacrylonitrile; polyvinyl alcohol; polyester (e.g. polyethylene terephthalate (PET), polyester naphthalate, and polycarbonate); polymers with high aromaticity such as phenolic resin or cresol-formaldehyde, polystyrene, polyvinyltoluene, polyvinyl xylene, polyfluorene imine, polyamine, polyamidimide, polyether phthalimide, polysulfide, polyfluorene, polyphenylene, and polyphenyl ether; polyurethane (PU); epoxy resin; polyolefin (e.g. polypropylene, polymethylpentene, and cyclic olefin); cellulose; polysiloxane and other Si-containing polymers (e.g. poly(silsesquioxane) and poly(silane)); polyvinyl chloride (PVC); polyacetate; polynorbornene; synthetic rubber (e.g. ethylene-propylene rubber (EPR), styrene-butadiene rubber (SBR), ethylene-propylene-diene monomer (EPDM)); and fluoropolymers (e.g. polyvinylidene fluoride, polytetrafluoroethylene polyhexafluoropropylene), or a copolymer of fluorine-olefin and hydrocarbon olefin. The above-mentioned polymers can be additionally added with a photo-sensitive material for satisfying the requirement of the exposure process for patterning the photo-sensitive layer 130. In other embodiments, the photo-sensitive layer 130 can be made of inorganic materials mixed with the photo-sensitive material such as silicon dioxide, mullite, alumina, SiC, carbon fiber, MgO—$Al_2O_3$—$SiO_2$, $Al_2O_3$—$SiO_2$, or MgO—$Al_2O_3$—$SiO_2$—$Li_2O$.

In addition, the above-mentioned photo-sensitive layer 130 and the metal nanowires 140 made of the selected polymers can form a composite structure having some specific chemical, mechanical, and optical properties. For example, the selected polymer can provide the adhesive property or a better physical mechanical strength between the composite structure and the substrate 110. Thus, the photo-sensitive layer 130 can be used as a matrix. Besides, the photo-sensitive layer 130 can be made of some specific polymers for providing additional protections (e.g. anti-scratch and anti-wear). In this case, the photo-sensitive layer 130 can function as an overcoat layer (OC layer). For example, when the photo-sensitive layer 130 is made of polyacrylate, epoxy resin, polyurethane, polysilane, polysiloxane, or poly(Si-acrylic), the composite structure can have higher surface strength for increasing the anti-scratch ability. Moreover, the photo-sensitive layer 130 or the polymer can be further added with a crosslinker, polymerization inhibitor, stabilizer (e.g., for example but not limited to, antioxidants or ultra-violet (UV) stabilizers), surfactant, or any similar additives or mixtures of the above additives for enhancing the anti-UV ability of the composite structure or extending the shelf life of the composite structure. In some embodiments, the photo-sensitive layer 130 can further comprise an etch inhibitor. To be noted, the above examples only provide some possible additives and additional functions (names) of the photo-sensitive layer 130, and are not to limit the scope of this disclosure. In addition, if the photo-sensitive polymer is added with the UV stabilizer, which may affect the precision of the exposure and developing processes, this disclosure can adjust the parameter of exposure (e.g. the exposure intensity) for decreasing the interference to the exposure precision caused by the UV stabilizer. The physical structure between the photo-sensitive layer 130 and the metal nanowire layer 140A is not limited. For example, the photo-sensitive layer 130 and the metal nanowire layer 140A can be a stack structure containing two layers, or the photo-sensitive layer 130 and the metal nanowire layer 140A can be integrated to form a composite layer (i.e. a composite conductive structure layer). For the sake of a clear description, the photo-sensitive layer 130 and the metal nanowire layer 140A of this disclosure are shown as a stack structure containing two layers.

Figure 5:
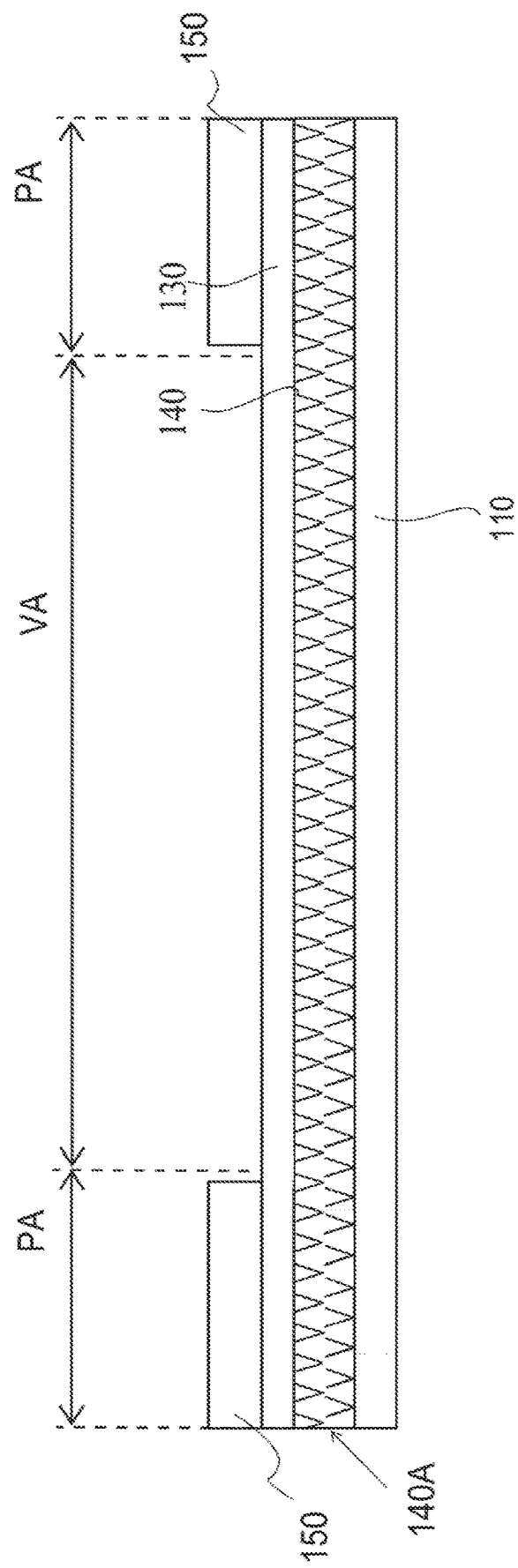
FIG. 5 is a schematic diagram showing the step S3 of the manufacturing method of FIG. 1.

Afterwards, referring to FIG. 5, the step S3 is to form the photo-sensitive conductive layer 150 on the peripheral area PA. As shown in FIG. 5, the photo-sensitive conductive layer 150 is formed on the composite structure of the photo-sensitive layer 130 and the metal nanowires 140. The photo-sensitive conductive layer 150 is roughly formed on the peripheral area PA, but it can still protrude from the peripheral area PA and extend to the display area VA depending on the requirements.

In one embodiment, the photo-sensitive conductive layer 150 is made of a photo-sensitive conductive material, which is patterned by the light curing process (exposure process) and developing process to form the photo-sensitive conductive layer 150. Specifically, the photo-sensitive conductive layer 150 can be made of a negative photo-sensitive silver paste or a photo-sensitive Ag/Cu composite metal paste, but this disclosure is not limited thereto.

In one embodiment, the specific method for forming the photo-sensitive conductive layer 150 on the peripheral area PA comprises, for example but not limited to, coating a silver paste material on the peripheral area PA and then pre-curing/curing the silver paste material to form the photo-sensitive conductive layer 150. In one specific embodiment, the step of pre-curing/curing the silver paste material is performed at a temperature of about 90-110° C. for about 10-20 minutes.

In one embodiment, the photoresist material of the photo-sensitive layer 130 and the silver paste material of the photo-sensitive conductive layer 150 can be pre-cured in the same one step. Alternatively, the photoresist material of the photo-sensitive layer 130 can be pre-cured in advance (e.g. a soft-baking step after the step S2), so that the photoresist material of the photo-sensitive layer 130 is in a pre-cured status. Afterwards, the silver paste material and the pre-cured photo-sensitive layer 130 are processed by the same curing process.

Figure 6:
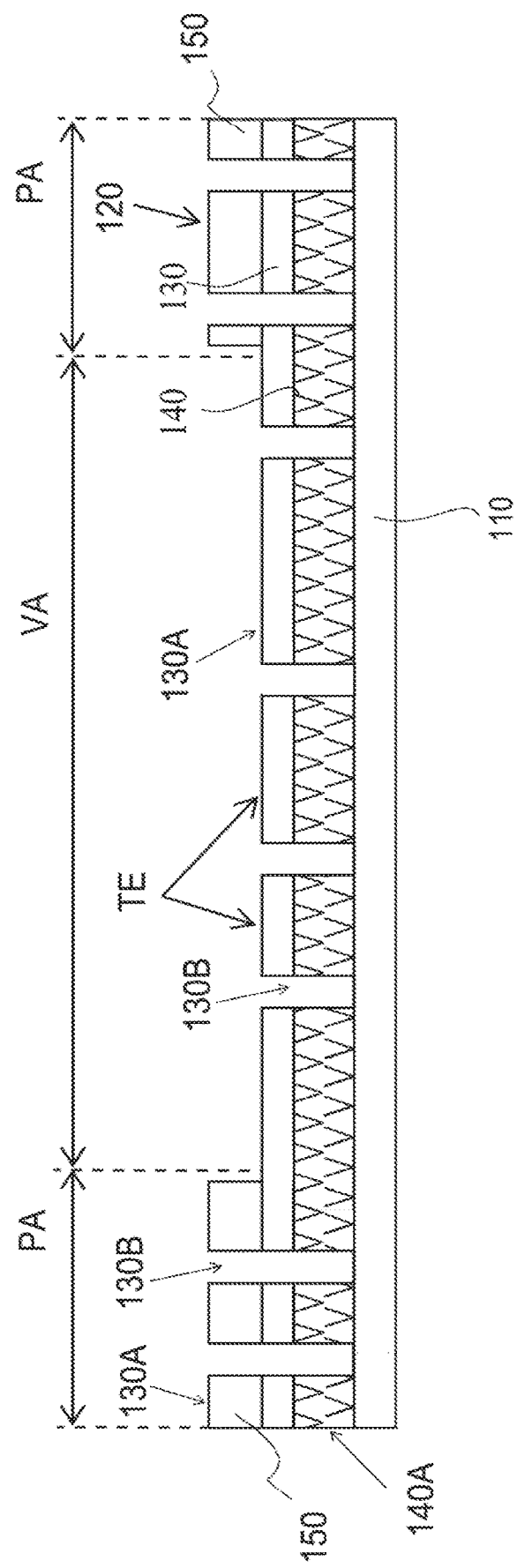
FIG. 6 is a schematic diagram showing a touch panel according to some embodiments of this disclosure.

Next, the step S4 is to perform a patterning step. In one embodiment, the patterning step comprises a photolithography process. In this disclosure, the photo-sensitive layer 130 and the photo-sensitive conductive layer 150 are processed with the exposure process and the developing process (photolithography process) based on the photo sensitivities of the photo-sensitive layer 130 and the photo-sensitive conductive layer 150, thereby patterning the composite structure of the metal nanowires 140 of the photo-sensitive layer 130 and the photo-sensitive conductive layer 150. FIG. 6 shows the structure after the patterning step. Specifically, the patterning process comprises steps of: exposing the photo-sensitive layer 130 and the photo-sensitive conductive layer 150 to define the remaining area 130A and the removing area 130B (as shown in FIGS. 7A and 7B), and removing the materials in the removing area (including the metal nanowires 140, the photoresist material, or the silver paste material) for forming the pattern of the composite structure and the photo-sensitive conductive layer 150.

In one specific embodiment, a mask is provided to cover the photo-sensitive layer 130 and the photo-sensitive conductive layer 150, and then a light source (e.g. UV light source) having the exposure energy of about 200-1500 mj/cm$^2$ is used to transfer the pattern of the mask to the photo-sensitive layer 130 and the photo-sensitive conductive layer 150. Preferably, the exposure energy of the UV light is about 600-800 mj/cm$^2$. Accordingly, the removing area 130B and the remaining area 130A can be defined, and an interface between the removing area 130B and the remaining area 130A is also defined. Next, a developer solution (or releasing agent) is provided to remove parts of the photo-sensitive layer 130 and the metal nanowire layer 140A located in the removing area 130B (the first removing area) of the display area VA, thereby forming the touch sensing electrode TE in the display area VA. Simultaneously, the developer solution can also remove parts of the photo-sensitive conductive layer 150, the photo-sensitive layer 130, and the metal nanowire layer 140A located in the removing area 130B (the second removing area) of the peripheral area PA, thereby forming the peripheral conductive trace 120 in the peripheral area PA. In addition, the remaining photo-sensitive layer 130 or composite structure in the display area VA has an exposed sidewall, the remaining photo-sensitive conductive layer 150, the photo-sensitive layer 130, and the metal nanowire layer 140A or composite structure containing the photo-sensitive layer 130 and the metal nanowire layer 140A in the peripheral area PA also has an exposed sidewall. In this disclosure, the peripheral conductive trace 120 mainly corresponds to the electrode in the peripheral area PA used for signal transmission, so it can be a single-layer structure formed by patterning the photo-sensitive conductive layer 150, or it can be a multi-layer structure containing the photo-sensitive conductive layer 150, the photo-sensitive layer 130, and the metal nanowire layer 140A. For the sake of brevity, these aspects will be alternately used in the following embodiments.

Specifically, in this embodiment, the photo-sensitive layer 130 and the photo-sensitive conductive layer 150 can be made of materials with the same bandwidth absorption characteristics. For example, the materials can both be photoresists sensitive to the G-line light source or the I-line light source, so that the materials of the photo-sensitive layer 130 and the photo-sensitive conductive layer 150 can be exposed by the same one light source. The photo-sensitive layer 130 and the photo-sensitive conductive layer 150 can have the same photo-sensitive characteristics (e.g. both negative photo-sensitive), but this disclosure is not limited thereto. If the materials of the photo-sensitive layer 130 and the photo-sensitive conductive layer 150 are negative photo-sensitive, the removing area 130B is defined as a non-exposure region, and the remaining area 130A is defined as an exposure region. Accordingly, in the display area VA, the developer solution can remove the part of the photo-sensitive layer 130 in the removing area 130B (developing process), and the exposed metal nanowire layer 140A can also be removed by the developer solution, thereby forming the touch sensing electrode TE. Similarly, in the peripheral area PA, the developer solution can remove the part of the photo-sensitive layer 130 and the photo-sensitive conductive layer 150 in the removing area 130B, and the exposed metal nanowire layer 140A in the removing area 130B can also be removed, thereby forming the peripheral conductive trace 120. To be noted, the above-mentioned developing process is a well-known technology in the field. In brief, the part of the photo-sensitive material in the photo-sensitive layer 130 or the photo-sensitive conductive layer 150 can receive the light emitted from the light source so as to generate a chemical reaction, so that the chemical bonds in the exposed part become stronger, and thus the developer solution cannot remove the exposed part. In contrary, the non-exposed part can be removed by the developer solution (the material is negative photo-sensitive).

In practice, the part of the photo-sensitive layer 130 and/or the photo-sensitive conductive layer 150 located in the removing area 130B can be removed by tetramethylammonium hydroxide (TMAH), KOH, xylene ($C_6H_4(CH_3)_2$), butyl acetate, $Na_2CO^3$ (concentration: 0.1% to 1%), or aromatic hydrocarbon solvent. In other embodiments, the developer solution can be combined with other solvents for performing the step of removing the photo-sensitive conductive layer 150, the photo-sensitive layer 130, and the metal nanowire layer 140A located in the removing area 130B. In one embodiment, after the above photolithography process, the line width of the photo-sensitive conductive layer 150 can be reduced to 10 μm, which is about ⅓ of that made by the conventional process. The feature can further satisfy the narrow border requirement.

Accordingly, the parts of the photo-sensitive layer 130 and the metal nanowire layer 140A located in the remaining area 130A can remain to form the touch sensing electrode TE. In other words, the touch sensing electrode TE is formed by the composite structure located on the display area VA after the patterning process (referring to FIGS. 7A and 7B). Besides, the parts of the photo-sensitive conductive layer 150 located in the remaining area 130A can remain to form the peripheral conductive trace 120. In other words, the peripheral conductive trace 120 is formed by the photo-sensitive conductive layer 150 located on the peripheral area PA after the patterning process. The photo-sensitive layer 130 and the metal nanowire layer 140A disposed under the photo-sensitive conductive layer 150 can also be patterned, so that the peripheral conductive trace 120 can be electrically connected with the touch sensing electrode TE through the metal nanowire layer 140A disposed under the peripheral conductive trace 120 for transmitting signals.

Figure 6A:
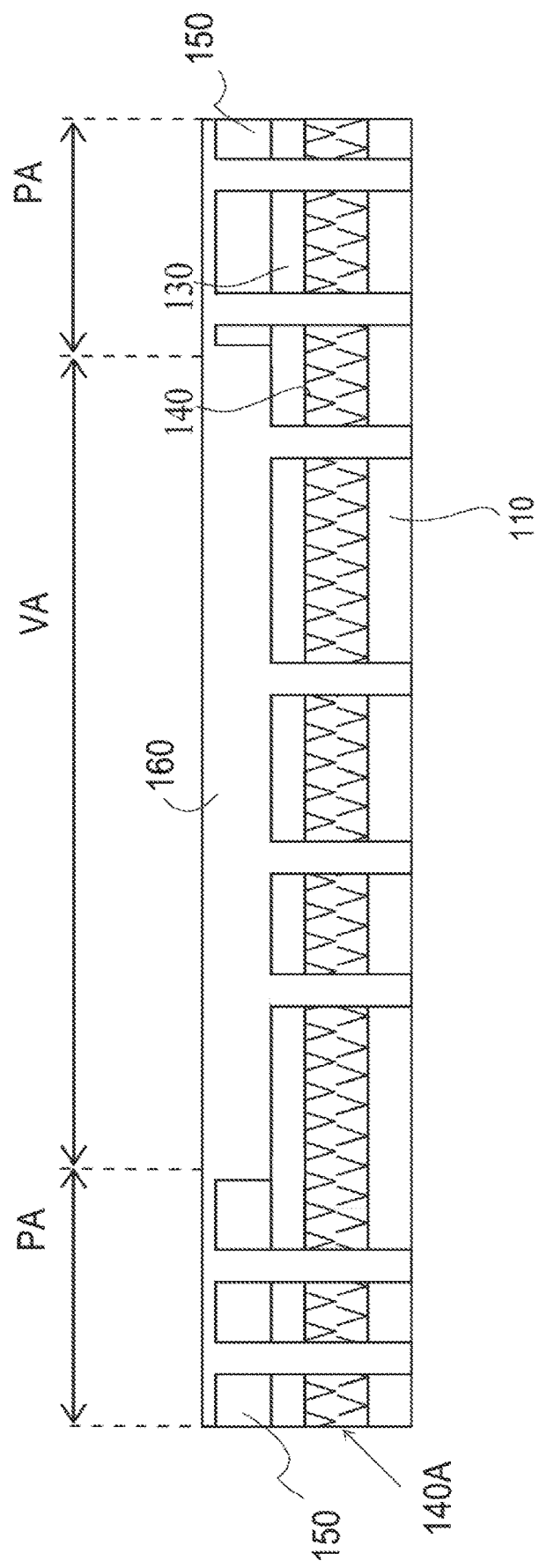
FIG. 6A is a schematic diagram showing a touch panel according to some embodiments of this disclosure.

In one embodiment, the photoresist material of the photo-sensitive layer 130 and the silver paste material of the photo-sensitive conductive layer 150 are cured in the same curing step. For example, the hard baking step is performed after the step S4, so that the silver paste material and the pre-cured photo-sensitive layer 130 can be simultaneously cured. After the hard baking step, the patterned photo-sensitive layer 130, the metal nanowire layer 140A, and the photo-sensitive conductive layer 150 can have a better structural strength. In one embodiment, a protection layer 160 (as shown in FIG. 6A) can be formed to cover the patterned structure.

Figure 7:
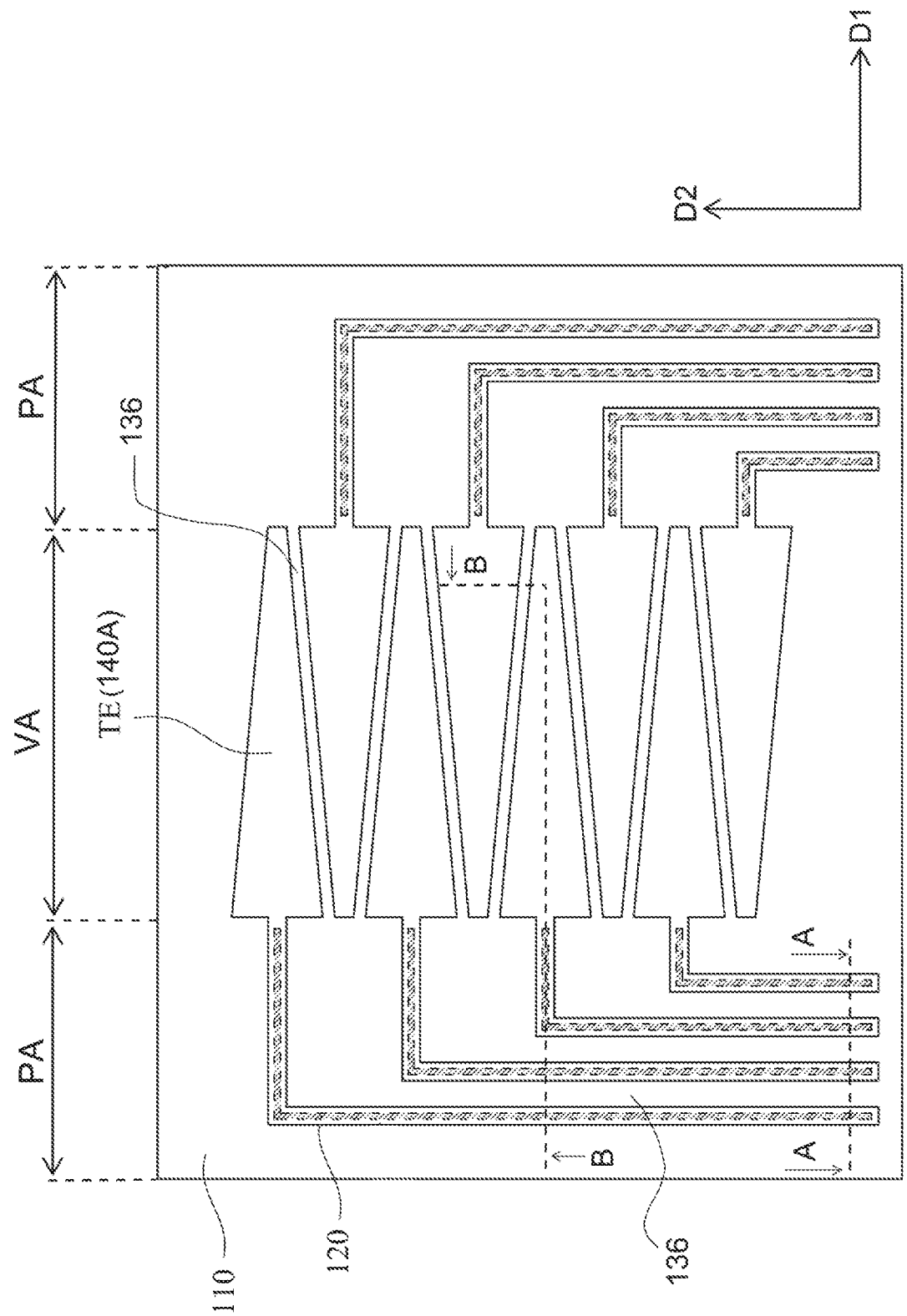
FIG. 7 is a top view of a touch panel according to some embodiments of this disclosure.
Figure 7A:
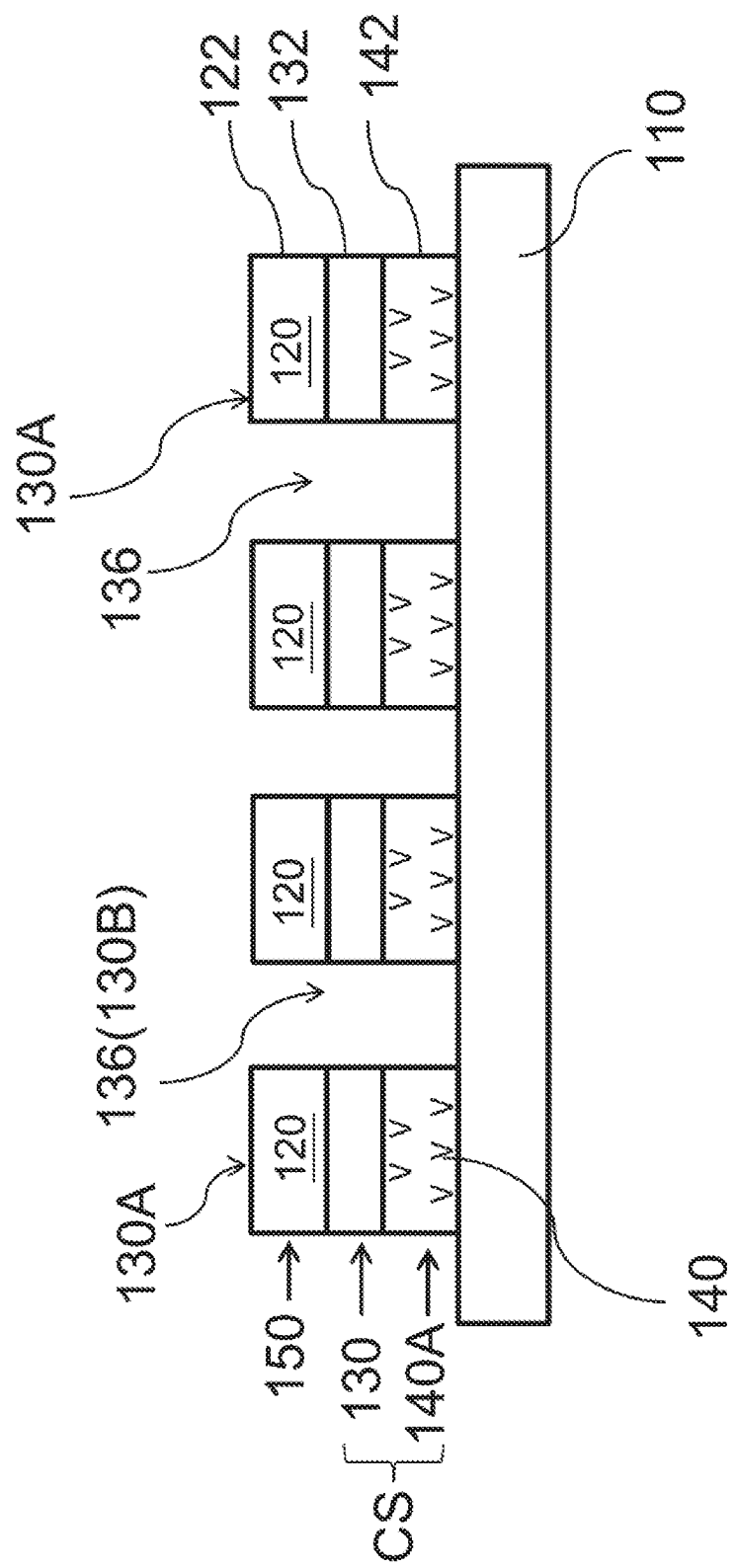
FIG. 7A is a sectional view of FIG. 7 along the line A-A.
Figure 7B:
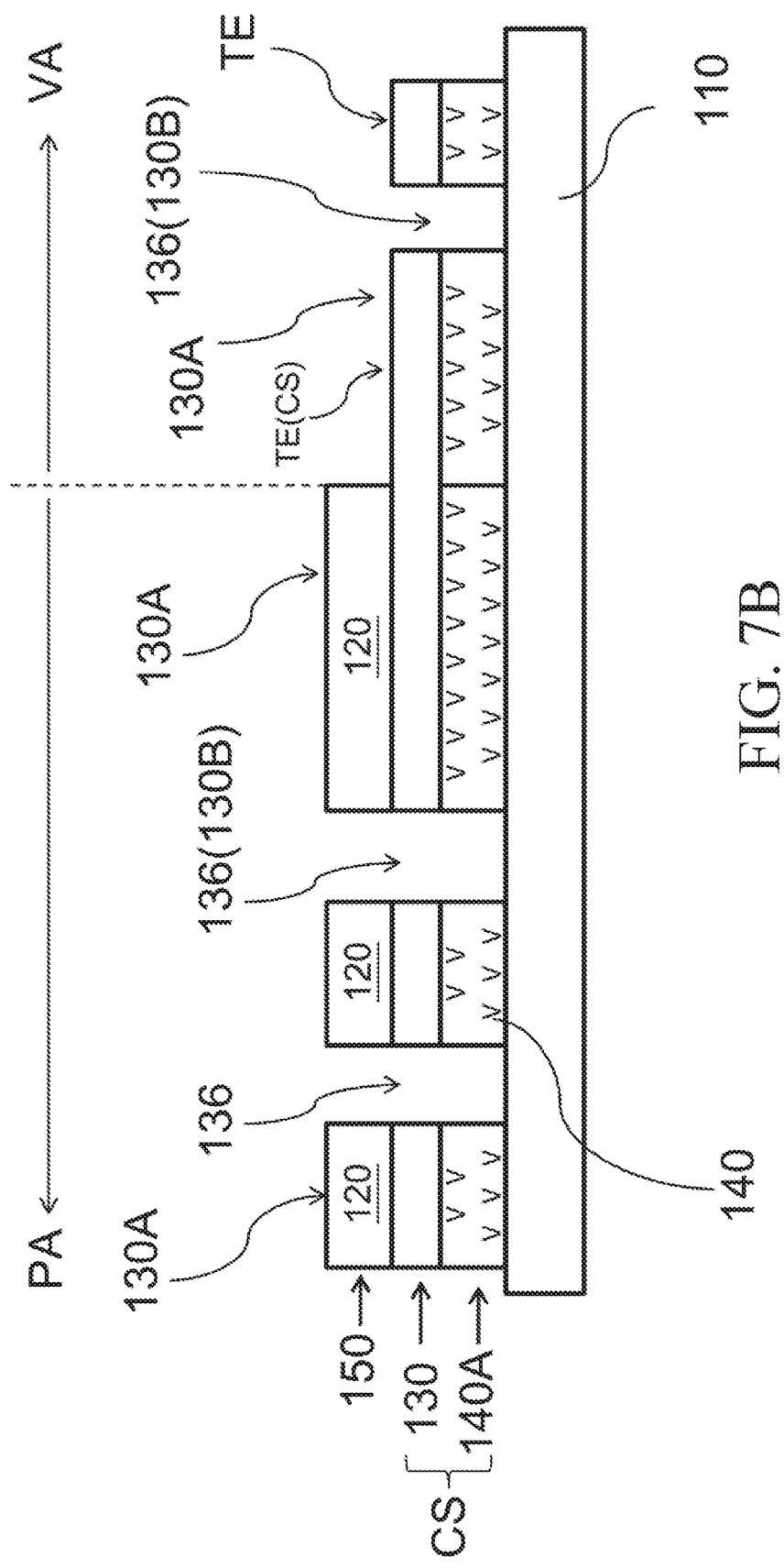
FIG. 7B is a sectional view of FIG. 7 along the line B-B.

FIG. 7 is a top view of a touch panel according to some embodiments of this disclosure, FIG. 7A is a sectional view of FIG. 7 along the line A-A, and FIG. 7B is a sectional view of FIG. 7 along the line B-B. The sectional view along the line A-A shows the aspect of the remaining area 130A and the removing area 130B located on the peripheral area PA, and the sectional view along the line B-B shows the aspect of the remaining area 130A and the removing area 130B located on the peripheral area PA and the display area VA. As shown in FIGS. 7A and 7B, after the exposure and developing processes, the photo-sensitive layer 130 and the photo-sensitive conductive layer 150 located on the peripheral area PA can be defined with the (second) removing area 130B and the remaining area 130A, and the parts of the photo-sensitive conductive layer 150, the photo-sensitive layer 130, and the metal nanowire layer 140A located in the removing area 130B are removed to form a space (the following non-conductive area 136). Simultaneously, the part of the photo-sensitive conductive layer 150 located in the remaining area 130A is patterned to form the peripheral conductive trace 120. The patterned composite structure CS is also formed under the peripheral conductive trace 120, and the non-conductive area 136 is configured between two adjacent peripheral conductive traces 120. Moreover, the first exposed sidewall 122 of the peripheral conductive trace 120, the second exposed sidewall 142 and the third exposed sidewall 132 are all aligned. Since the structural layers of the peripheral area PA are patterned by the same step, the alignment step for two coating layers of the conventional manufacturing process can be omitted. Accordingly, the requirement for the alignment tolerance area in the manufacturing process can be reduced or avoided, thereby decreasing the width of the peripheral area PA and thus achieving the narrow border requirement of the touch panel/touch display device.

As shown in FIG. 7B, in the display area VA, the parts of the photo-sensitive layer 130 and the metal nanowire layer 140A located in the remaining area 130A together form a transparent conductive layer, which is patterned in the above-mentioned photolithography process to form the touch sensing electrode TE. In this embodiment, the parts of the photo-sensitive layer 130 and the metal nanowire layer 140A located in the (first) removing area 130B are removed to form a space, which defines the non-conductive area 136 between the adjacent touch sensing electrodes TE. Moreover, the touch sensing electrode TE can be electrically connected with the peripheral conductive trace 120 through the metal nanowire layer 140A extending to the peripheral area PA.

In one embodiment, taking the display area VA as an example, the composite structure (i.e. the touch sensing electrode TE) located in the remaining area 130A has an exposed sidewall, which is the interface of the light chemical reaction between the removing area 130B and the remaining area 130A. In the conventional etching process, the strong-acidic etching agent can only remove the metal nanowires 140 but cannot remove the overcoat layer. On the contrary, this disclosure can remove both of the photo-sensitive layer 130 and the metal nanowire layer 140A, thereby eliminating the interference to the following processes caused by the residual overcoat layer. In one embodiment, the metal nanowires 140 of the metal nanowire layer 140A protrude beyond the exposed sidewall.

This embodiment provides an integrated developing step for simultaneously removing the parts of the photo-sensitive layer 130 and the metal nanowire layer 140A located in the (first) removing area 130B on the display area VA by the developer solution for forming the touch sensing electrode TE, and removing the parts of the photo-sensitive conductive layer 150, the photo-sensitive layer 130, and the metal nanowire layer 140A located in the (second) removing area 130B on the peripheral area PA by the same developer solution for forming the peripheral conductive trace 120. To be noted, this disclosure is not limited thereto, and any manufacturing process that can simultaneously remove the photo-sensitive layer 130/the photo-sensitive conductive layer 150 and pattern the metal nanowire layer 140A is included in the scope of this disclosure.

In one embodiment, as shown in FIG. 7A, the parts of the metal nanowires 140 (including other materials of the metal nanowire layer 140A) and the photo-sensitive layer 130 between the adjacent peripheral conductive traces 120 can be completely removed. In other words, the parts of the metal nanowires 140 and the photo-sensitive layer 130 between the adjacent peripheral conductive traces 120 can be all removed by the above-mentioned exposure and developing processes, and nothing is left therebetween, thereby forming an isolation area (i.e. the following non-conductive area 136). There are no metal nanowires 140 and photo-sensitive layer 130 existing in the non-conductive area 136. In other words, the non-conductive area 136 is a void (i.e., space structure), and the concentration of the metal nanowires 140 in the void is zero. Accordingly, the adjacent peripheral conductive traces 120 can be electrically isolated, thereby achieving the desired circuit layout of the touch panel. In one embodiment, an auxiliary removing step can be applied to completely remove the metal nanowires 140 in the non-conductive area 136. For example, an adhesion method is applied after the above-mentioned developing step for completely removing the metal nanowires 140 in the first removing area or the second removing area.

Similarly, as shown in FIG. 7B, the removing area 130B of the display area VA is defined with the touch sensing electrode, which is disposed corresponding to the isolation area (the non-conductive area 136) between the adjacent touch sensing electrodes TE, for sensing different touch positions. In other words, there are no metal nanowires 140 and photo-sensitive layer 130 existing in the non-conductive area 136 between the adjacent touch sensing electrodes TE. That is, the non-conductive area 136 between the adjacent touch sensing electrodes TE is a void, and the concentration of the metal nanowires 140 in the void is zero.

Preferably, the metal nanowires 140 can form a conductive network in the photo-sensitive layer 130, thereby forming the transparent conductive layer. After the above-mentioned patterning process, the transparent conductive layer can form the touch sensing electrode TE in the display area VA. In order to provide a better display effect, the light transmission of the composite structure of the metal nanowires 140 and the photo-sensitive layer 130 is greater than 80%, and the surface resistance thereof is between about 10 ohm/square and 1000 ohm/square. Preferably, the light transmission of the composite structure of the metal nanowires 140 and the photo-sensitive layer 130 is greater than 85%, and the surface resistance thereof is between about 50 ohm/square and 500 ohm/square.

In one embodiment, the thickness of the photo-sensitive layer 130 can be controlled to be very thin, so that the metal nanowires 140 can protrude beyond the photo-sensitive layer 130. For example, the thickness of the photo-sensitive layer 130 can be less than 90 nm, so that the metal nanowires 140 can protrude beyond the top surface of the photo-sensitive layer 130. In the peripheral area PA, the peripheral conductive trace 120 can have better contact with the exposed metal nanowires 140, so that the impedance of the signal transmission path formed by the touch sensing electrode TE and the peripheral conductive trace 120 can be lower. In one embodiment, the thickness of the photo-sensitive layer 130 is between about 10 nm and 2 μm.

Preferably, a post-treatment of the metal nanowires 140 can be performed to increase the conductivity thereof. The post-treatment may comprise the process of heating, plasma, corona discharge, UV ozone, or pressing. For example, after the step of curing the metal nanowire layer 140A, a roller is provided to press the metal nanowire layer 140A. In one embodiment, one or more rollers are provided to press the metal nanowire layer 140A with a pressure of 50-3400 psi, preferably, 100-1000 psi, preferably 200-800 psi, and more preferably 300-500 psi. In some embodiments, the heating and pressing processes can be performed simultaneously. In more detail, one or more rollers are provided to press the metal nanowire layer 140A, and the one or more rollers are also heated. For example, the applied pressure of the rollers can be 10-500 psi, and preferably 40-100 psi, and the one or more rollers are heated to 70-200° C., and preferably 100-175° C. These processes can increase the conductivity of the metal nanowire layer 140A. In some embodiments, the metal nanowires 140 are preferably exposed in a reduction agent for post-treatment. For example, the metal nanowires 140 comprising silver nanowires may preferably be exposed in a silver reduction agent for post-treatment. The silver reduction agent can be, for example, borohydride (e.g. sodium borohydride), boron nitrogen compound (e.g. dimethylaminoborane (DMAB)), or a gas reduction agent (e.g. hydrogen ($H_2$)). The exposure time is from about 10 seconds to about 30 minutes, and preferably from about 1 minute to about 10 minutes. The above step of applying pressure may be performed before or after the step of forming the photo-sensitive layer 130 according to actual needs.

As mentioned above, the touch panel of this embodiment comprises the touch sensing electrode TE formed on the display area VA of the substrate 110 (the composite structure including the photo-sensitive layer 130 and the metal nanowires 140) and the peripheral conductive trace 120 formed on the peripheral area PA of the substrate 110. The touch sensing electrode TE and the peripheral conductive trace 120 are electrically connected with each other for transmitting signals. The peripheral conductive trace 120 is formed by patterning the photo-sensitive conductive layer 150. In this embodiment, the composite structure including the photo-sensitive layer 130 and the metal nanowires 140 extends to the peripheral area PA, and can be patterned by the same developing step for patterning the photo-sensitive conductive layer 150. In more detail, in the peripheral area PA, the peripheral conductive trace 120 is formed on the composite structure, and they have the corresponding patterns. Specifically, the peripheral conductive trace 120 and the above-mentioned composite structure located on the peripheral area PA have the same or similar patterns after the photolithography process. In addition, the peripheral conductive trace 120 and the composite structure located on the peripheral area PA have exposed sidewalls, respectively, and the first exposed sidewall 122 of the peripheral conductive trace 120, the second exposed sidewall 142 of the metal nanowire layer 140A, and the third exposed sidewall 132 of the photo-sensitive layer 130 are aligned with each other to form a coplanar surface.

As shown in FIG. 7, the touch panel of this embodiment is a single-surface non-cross touch panel, which comprises one or more touch sensing electrodes TE. In more detail, a plurality of touch sensing electrodes TE are formed on the display area VA and extend in the same direction (e.g. the first direction D1), and the non-conductive area 136 defined by the (first) removing area 130B is formed between the adjacent touch sensing electrodes TE. Similarly, the non-conductive area 136 defined by the (second) removing area 130B is formed on the peripheral area PA for electrically isolating the adjacent metal nanowires 140. In the touch panel of this embodiment, the photo-sensitive layer 130, the metal nanowires 140, and the photo-sensitive conductive layer 150 can be directly patterned without using the etching agent. In this embodiment, the touch sensing electrodes TE located on the display area VA can be used to detect the touch position or gesture of the user, and the peripheral conductive trace 120 located on the peripheral area PA is electrically connected to the touch sensing electrodes TE for transmitting the sensing signals detected by the touch sensing electrodes TE to an external controller (not shown).

In another embodiment, the above-mentioned photolithography process cannot completely remove the metal nanowires 140 in the non-conductive area 136. In other words, the removing area 130B still contains some residual metal nanowires 140, but the concentration of the residual metal nanowires 140 is lower than a percolation threshold, while the photo-sensitive layer 130 in the removing area 130B is completely removed by the exposure and developing processes. The conductivity of the composite structure of the photo-sensitive layer 130 and the metal nanowires 140 is mainly controlled by the following factors: (a) the conductivity of a single metal nanowire 140, (b) the number of the metal nanowires 140, and (c) the communication (contact) between the metal nanowires 140. If the concentration of the metal nanowires 140 is lower than the percolation threshold, the distance between the metal nanowires 140 is very large, so the entire conductivity of the removing area 130B is very low or is zero (having high resistance). In other words, the metal nanowires 140 in the removing area 130B cannot provide the continuous current path and thus cannot form a conductive network, which means that the metal nanowires 140 form a non-conductive network in the non-conductive area 136. In one embodiment, a region or a structure is defined as non-conductive when the sheet resistance thereof is: greater than $10^8$ ohm/square, greater than $10^4$ ohm/square, greater than 3000 ohm/square, greater than 1000 ohm/square, greater than 350 ohm/square, or greater than 100 ohm/square. In other words, the space between the adjacent peripheral conductive traces 120 is filled with the metal nanowires 140 having a concentration lower than the percolation threshold, which can form a non-conductive network for achieving the isolation of the adjacent peripheral conductive traces 120. Similarly, the space between the adjacent touch sensing electrodes TE is filled with the metal nanowires 140 having a concentration lower than the percolation threshold, which can form a non-conductive network for achieving the isolation of the adjacent touch sensing electrodes TE.

Figure 8:
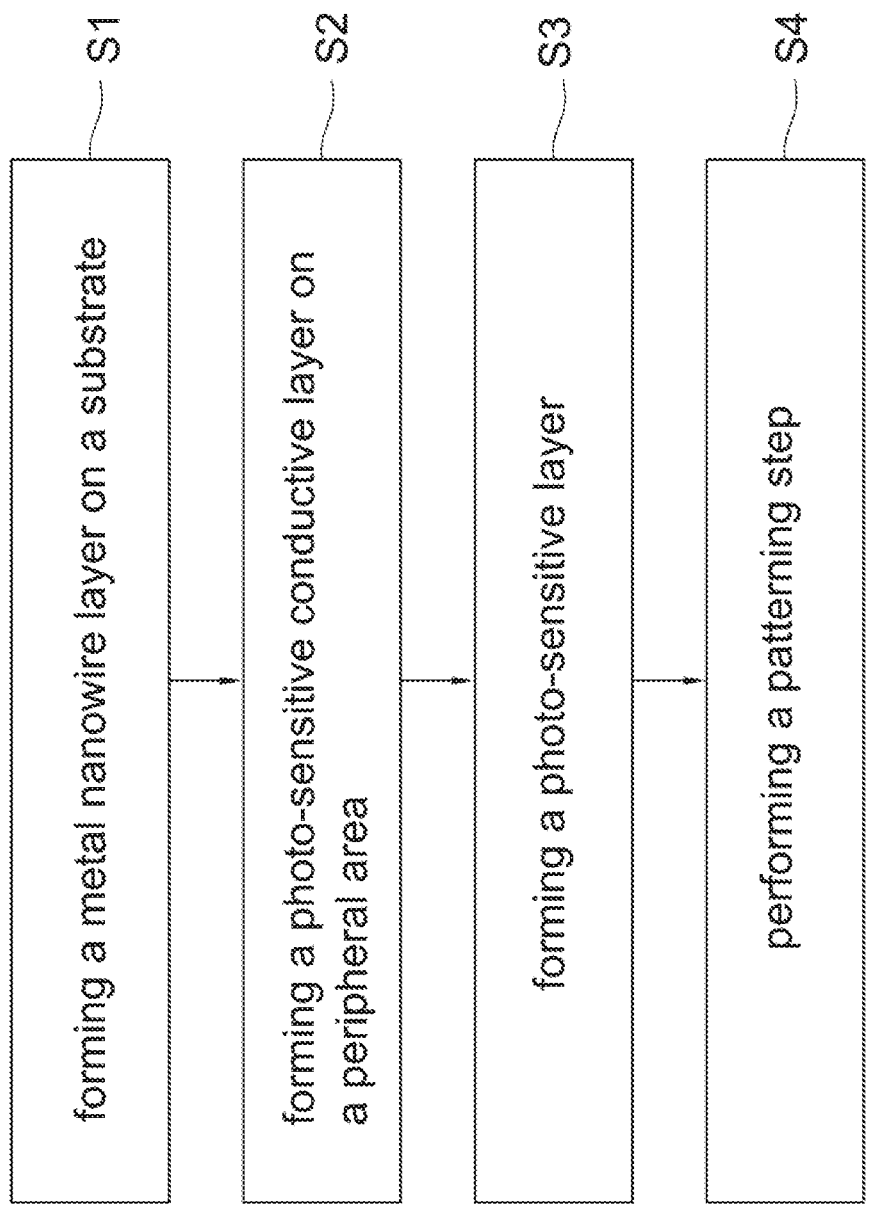
FIG. 8 is a flow chart of a manufacturing method for a touch panel according to some embodiments of this disclosure.
Figure 9:
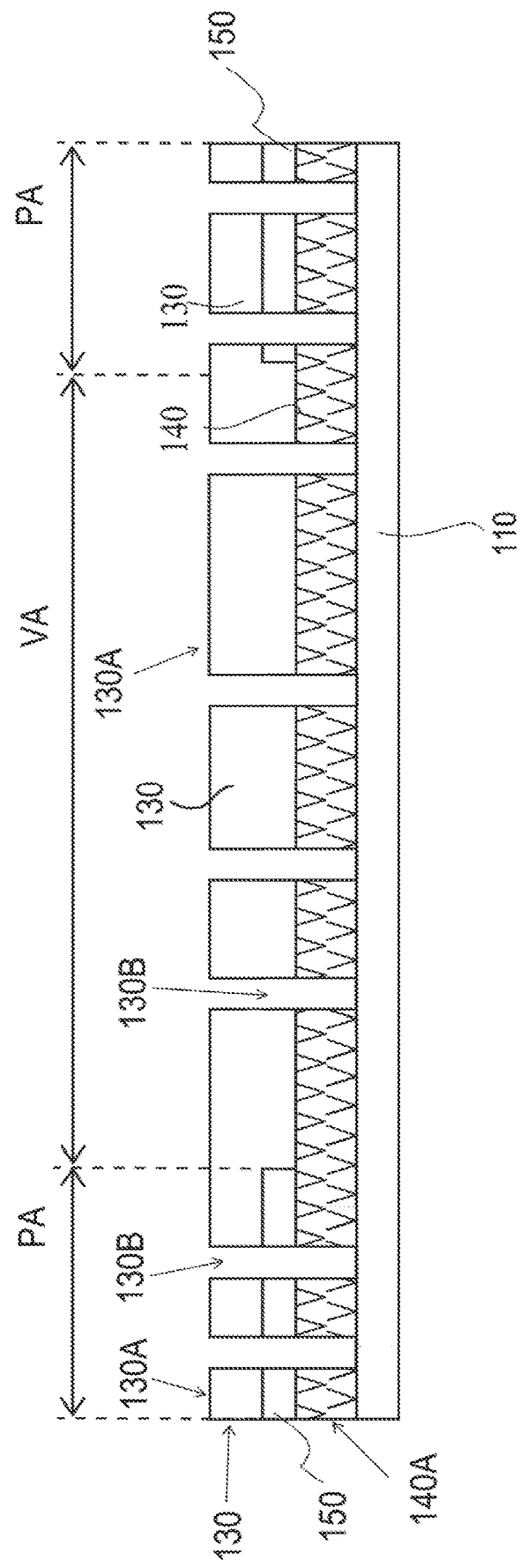
FIG. 9 is a schematic diagram showing the touch panel formed by the manufacturing method of FIG. 8.

FIG. 8 is a flow chart of a manufacturing method for a touch panel according to some embodiments of this disclosure. Compared with FIG. 1, the order of the steps of forming the photo-sensitive layer 130 and the photo-sensitive conductive layer 150 in the current embodiment is different from that of the embodiment of FIG. 1. In this embodiment, the metal nanowire layer 140A is formed first, then the photo-sensitive conductive layer 150 is formed on the peripheral area PA, and then the photo-sensitive layer 130 is formed to cover the metal nanowire layer 140A. The photo-sensitive layer 130 can be formed on the peripheral area PA and the display area VA to cover the metal nanowire layer 140A and the photo-sensitive conductive layer 150, or it can be formed on the display area VA only to cover the metal nanowire layer 140A. In the patterning step, the metal nanowire layer 140A located on the display area VA can be patterned by exposing and developing the photo-sensitive layer 130, and the photo-sensitive conductive layer 150 and the metal nanowire layer 140A located on the peripheral area PA can be patterned by exposing and developing the photo-sensitive conductive layer 150 and/or the photo-sensitive layer 130. FIG. 9 is a schematic diagram showing the touch panel formed by the manufacturing method of FIG. 8. The detailed description of this embodiment can be referred to the above embodiment, so the description thereof will be omitted. In one embodiment, since the silver paste material is a fluidic material, it can penetrate into the metal nanowire layer 140A. In other words, when the silver paste material is cured, the photo-sensitive conductive layer 150 and the metal nanowire layer 140A can form a composite conductive layer, which can be functioned as the above-mentioned peripheral conductive trace 120.

Figure 10A:
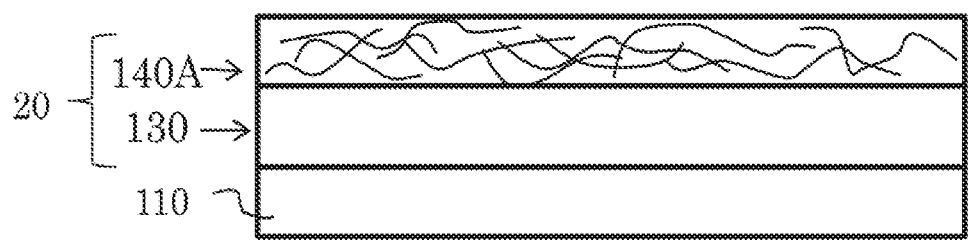
FIGS. 10A to 10C are schematic diagrams showing the procedure of the manufacturing method for a touch panel according to some embodiments of this disclosure.
Figure 10B:
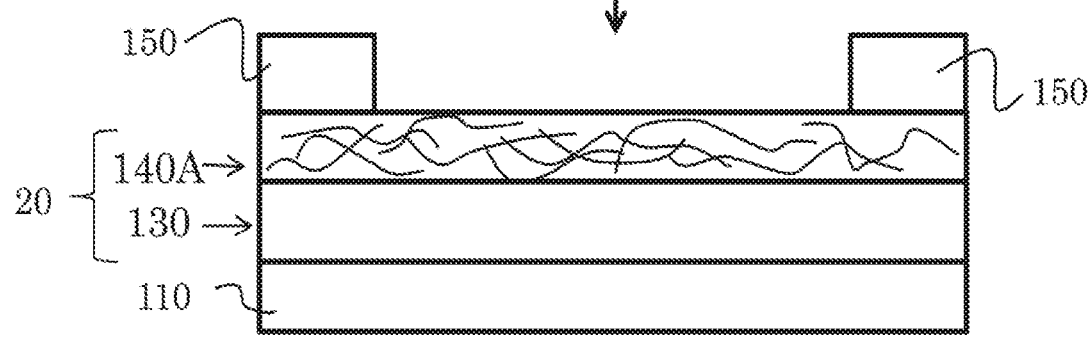
Figure 10C:
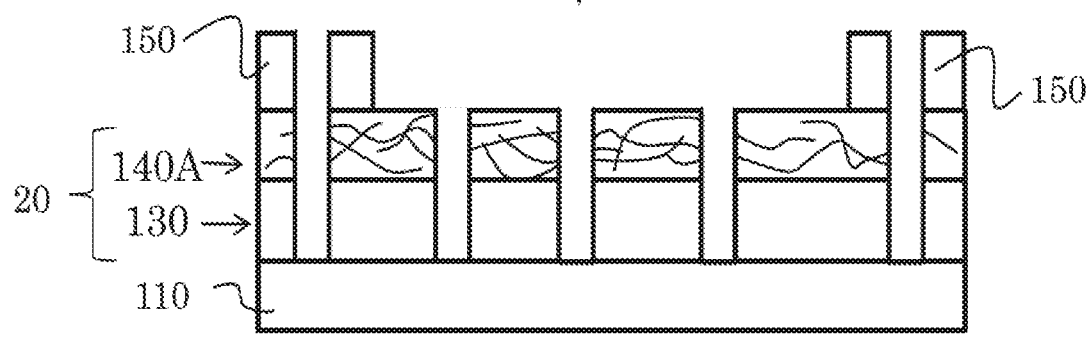

In another embodiment, the metal nanowire layer 140A can be individually formed as a composite film 20 in advance. For example, the metal nanowires 140 are applied on a carrier (not shown). Then, the composite film 20 is attached to the substrate 110 by the inherent adhesive of the composite film 20 or through an additional adhesive layer. Preferably, the composite film 20 has the above-mentioned photo-sensitive property. For example, the carrier can be made by a photo-sensitive resin, or the dispersion solution or ink containing the metal nanowires 140 can be added with a photo-sensitive additive. The photo-sensitive additive may include a free-radical type unsaturated oligomer such as a polyester acrylic resin, an epoxy acrylic resin, or the like. In one embodiment, the composite film 20 can be formed by integrating the metal nanowire layer 140A and the photo-sensitive layer 130 as shown in FIGS. 10A-C. As shown in FIG. 10A, the composite film 20 is attached to the substrate 110, and then the photo-sensitive conductive layer 150 is formed by the above-mentioned method (see FIG. 10B). Afterwards, the layers are patterned by the above-mentioned exposing and developing methods (see FIG. 10C) so as to form the touch panel of this embodiment. In one embodiment, the manufacturing method further comprises a step of removing the carrier. For example, the carrier can be removed by a full-surface exposure. Alternatively, if the carrier has a releasable property, the carrier may be removed by a release step. In addition, the composite film 20 and the photo-sensitive conductive layer 150 can be exposed in several exposing steps, and the exposed regions of the composite film 20 and the photo-sensitive conductive layer 150 are removed in the same developing step (taking a negative photoresist as an example).

Figure 11:
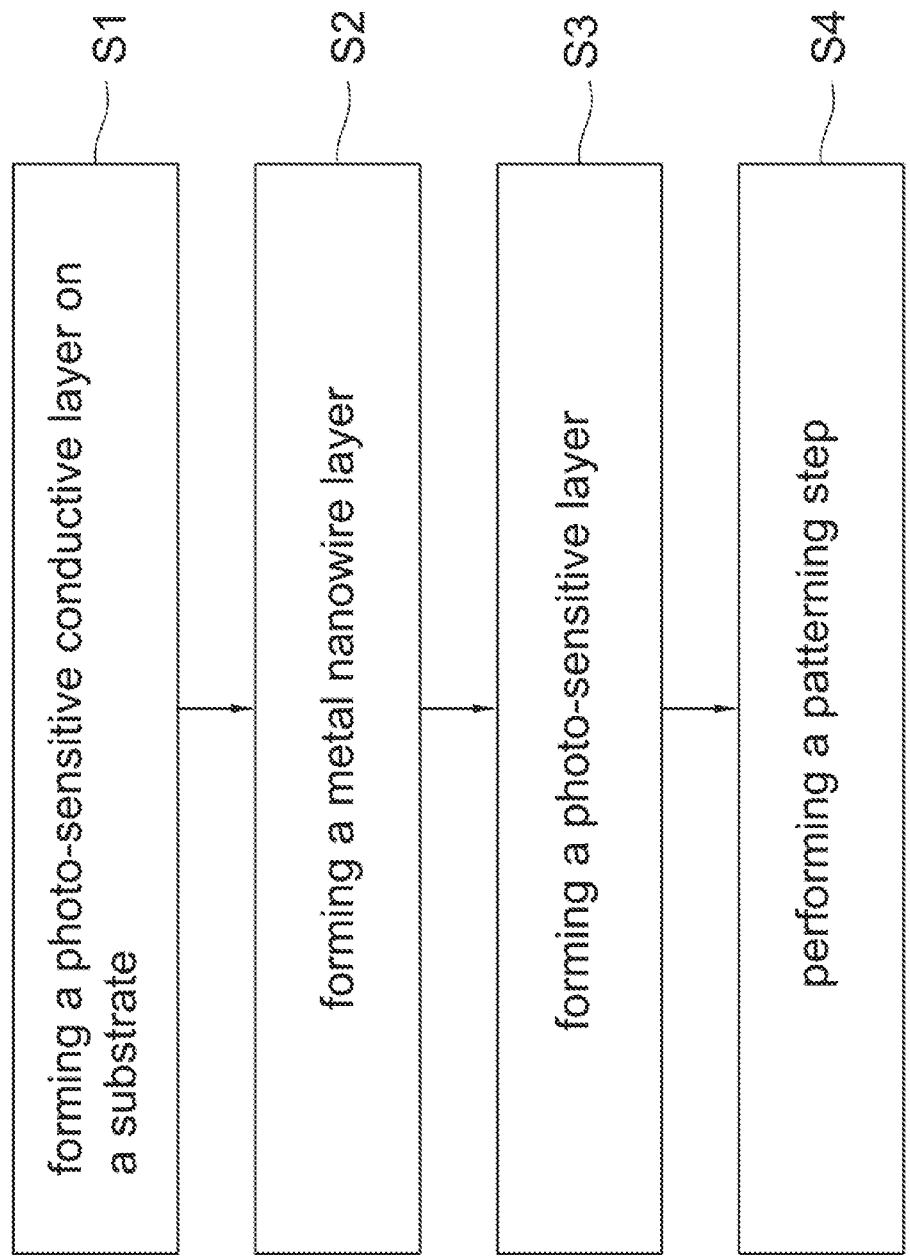
FIG. 11 is a flow chart of a manufacturing method for a touch panel according to some embodiments of this disclosure.

FIG. 11 is a flow chart of a manufacturing method for a touch panel according to some embodiments of this disclosure. Compared with FIG. 1, the order of the steps of the current embodiment is different from that of the embodiment of FIG. 1. In this embodiment, the photo-sensitive conductive layer 150 is formed first, and then the metal nanowire layer 140A and the photo-sensitive layer 130 are formed. Next, the patterning process as mentioned above is performed. Specifically, the photo-sensitive conductive layer 150 is formed on the peripheral area PA, and then the metal nanowire layer 140A and the photo-sensitive layer 130 are formed on the peripheral area PA and the display area VA. The first part of the metal nanowire layer 140A covers the photo-sensitive conductive layer 150. Afterwards, the photo-sensitive layer 130 is formed to cover the metal nanowire layer 140A. In the patterning step, the metal nanowire layer 140A located on the display area VA can be patterned by exposing and developing the photo-sensitive layer 130, and the photo-sensitive conductive layer 150 and the metal nanowire layer 140A located on the peripheral area PA can be patterned by exposing and developing the photo-sensitive conductive layer 150 and/or the photo-sensitive layer 130. The detailed description of this embodiment can be referred to the above embodiments, so the description thereof will be omitted.

Figure 12:
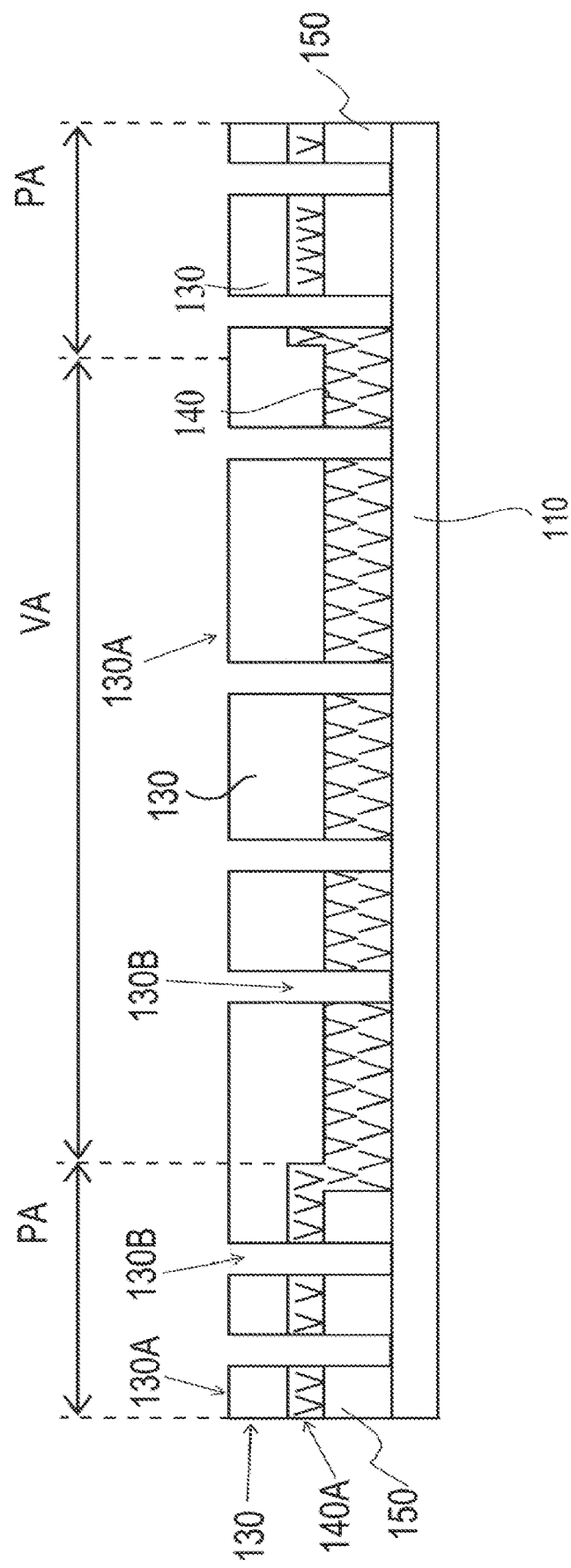
FIG. 12 is a schematic diagram showing the touch panel formed by the manufacturing method of FIG. 11.

FIG. 12 is a schematic diagram showing the touch panel formed by the manufacturing method of FIG. 11. As shown in FIG. 12, the photo-sensitive layer 130 located on the peripheral area PA is not disposed between the metal nanowire layer 140A and the photo-sensitive conductive layer 150, so that, in the peripheral area PA, the metal nanowire layer 140A is in direct contact with the photo-sensitive conductive layer 150. That is, the touch sensing electrode TE made of the metal nanowires 140 is in direct contact with the peripheral conductive trace 120, so that the contact impedance therebetween is lower, thereby decreasing the loss and distortion of the transmission of touch control signals. In addition, since the photo-sensitive layer 130 is formed as the outermost layer of the structure, the photo-sensitive layer 130 can also provide protection to the metal nanowire layer 140A and the photo-sensitive conductive layer 150. For example, the thickness of the photo-sensitive layer 130 is thick enough to cover the metal nanowires 140, so that the metal nanowires 140 do not protrude and are not exposed. In one embodiment, the thickness of the photo-sensitive conductive layer 150 is from about 1 µm to 2 µm.

Figure 13A:
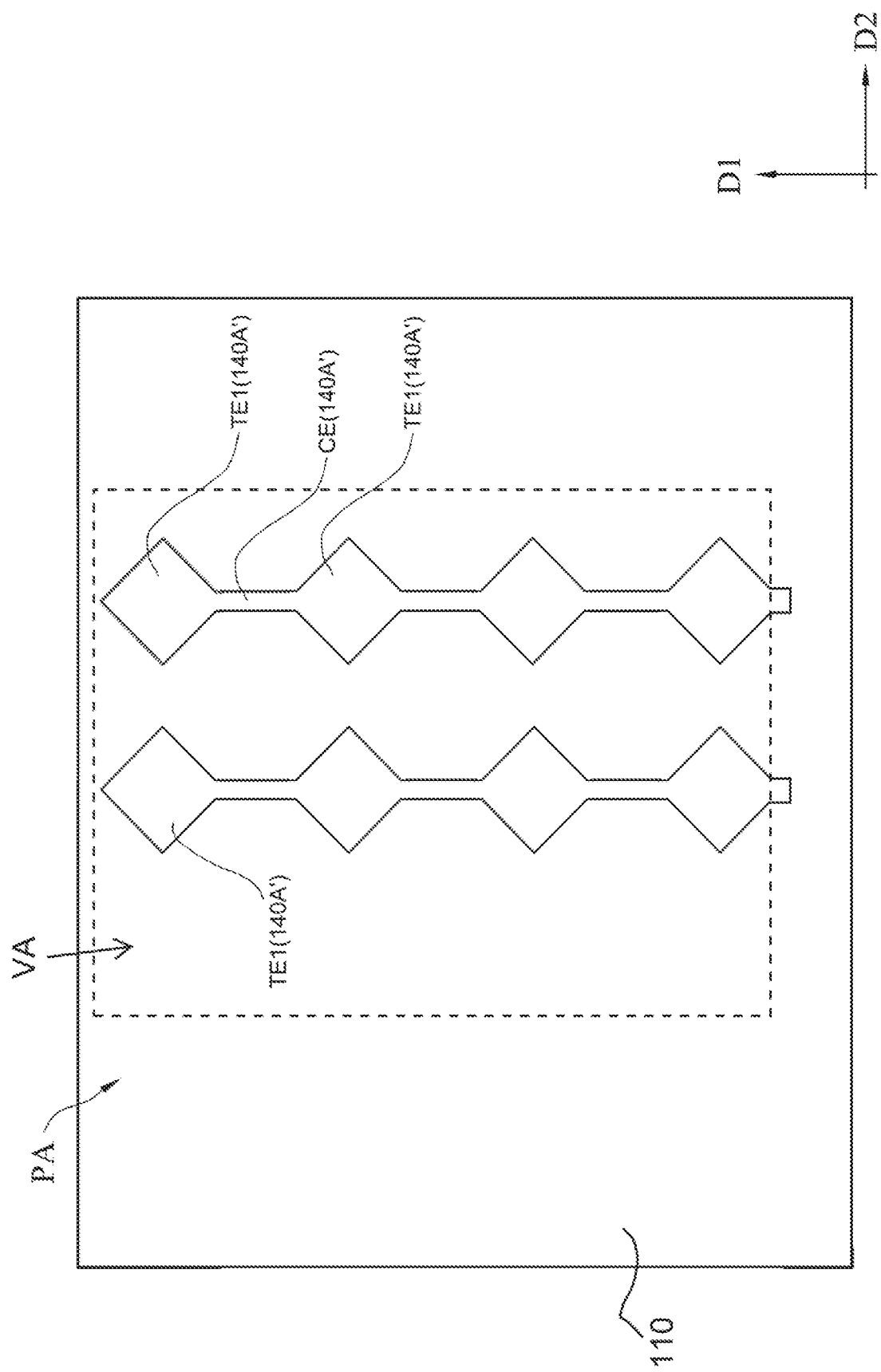
FIGS. 13A to 13C are schematic diagrams showing the procedure of the manufacturing method for a touch panel according to some embodiments of this disclosure.
Figure 13B:
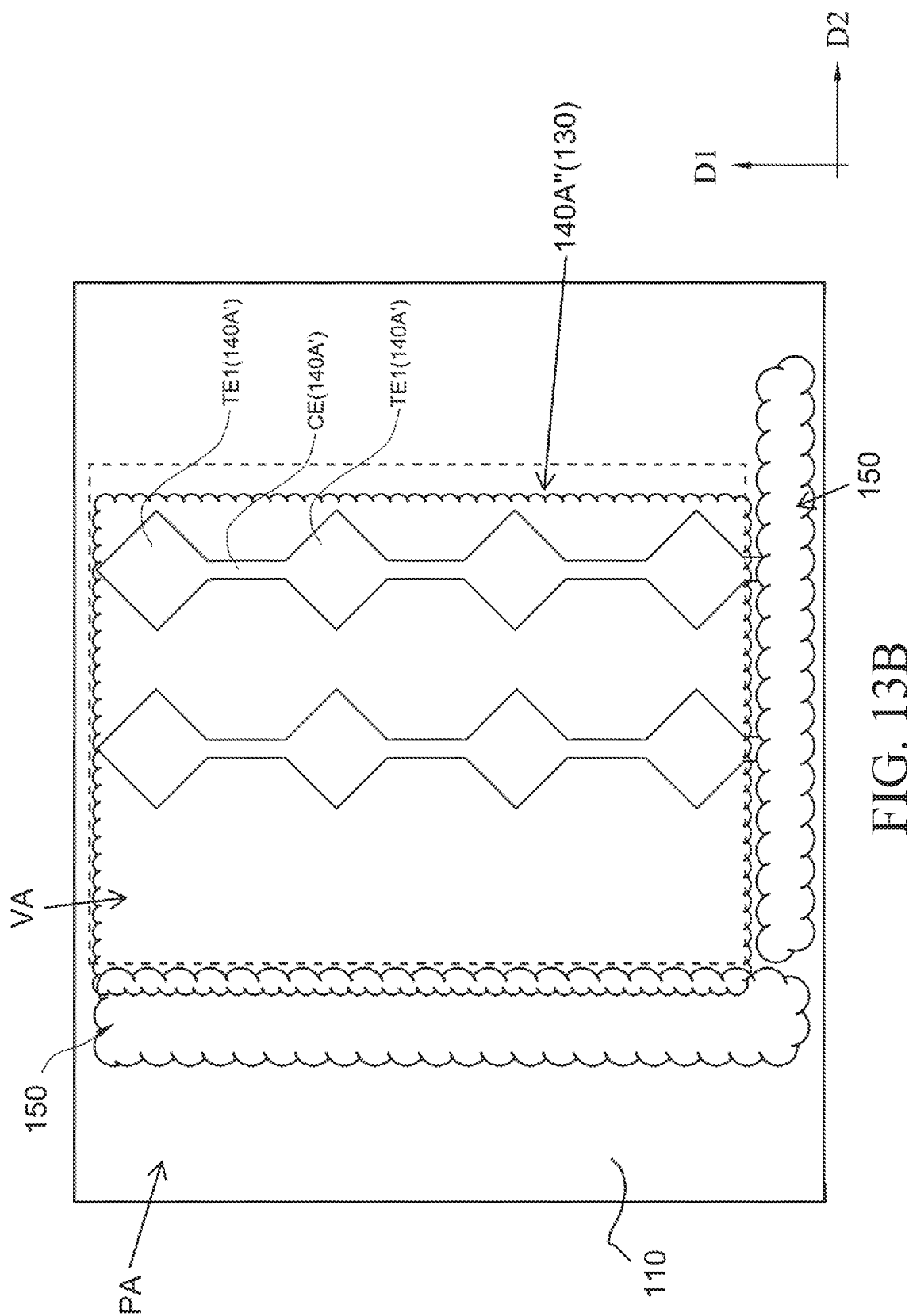
Figure 13C:
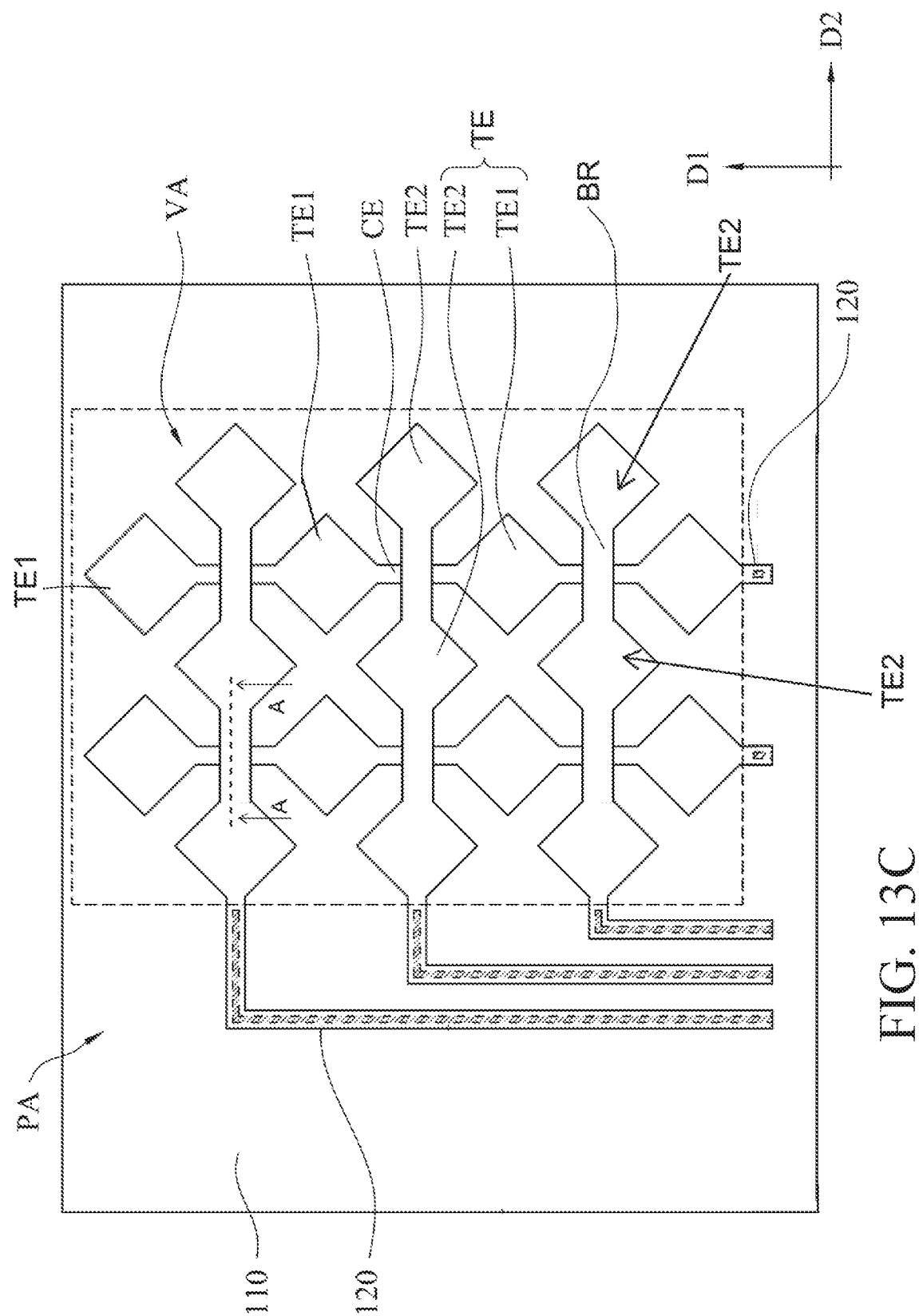

FIGS. 13A to 13C are schematic diagrams showing the procedure of the manufacturing method for a touch panel according to some embodiments of this disclosure. Different from the above embodiments, this embodiment provides two nanowire layers on the substrate 110 to form the dual-axial electrode structure. In this embodiment, at least one of the two nanowire layers is patterned by the same exposure and developing process of the photo-sensitive conductive layer 150, thereby forming the touch sensing electrode and peripheral conductive trace 120.

First, as shown in FIG. 13A, the patterned first metal nanowire layer 140A' is formed on the substrate 110. Specifically, this step comprises, for example but not limited to, forming the first metal nanowire layer 140A' on the substrate 110, and then patterning the first metal nanowire layer 140A' by the photolithography process and the etching process. In this embodiment, the patterned first metal nanowire layer 140A' can form the first touch sensing electrodes TE1 separately arranged in a row along the first direction D1. A connecting electrode CE is provided between two adjacent first touch sensing electrodes TE1. The first touch sensing electrodes TE1 and the connecting electrodes CE can construct (i.e., define) the first axial electrode, which is mostly located on the display area VA. To be noted, in order to contact the silver paste material used in the following manufacturing processes, the first axial electrode can extend from the display area VA to the peripheral area PA.

Alternatively, the exposure and developing processes can only pattern the first metal nanowire layer 140A'. Specifically, the first metal nanowire layer 140A' is formed, then the first photo-sensitive layer (not shown) is formed on the first metal nanowire layer 140A', and then the above-mentioned exposure and developing processes are performed for patterning the structure to form the first touch sensing electrodes TE1 and the connecting electrodes CE. In other words, the first touch sensing electrodes TE1 and the connecting electrodes CE both comprise the stacked structure of the first metal nanowire layer 140A' and the first photo-sensitive layer. In another embodiment, the first photo-sensitive layer (not shown) is formed, and then the first metal nanowire layer 140A' is formed on the first photo-sensitive layer (not shown). Afterwards, the above-mentioned exposure and developing processes are performed for patterning the structure to form the first touch sensing electrodes TE1 and the connecting electrodes CE.

Alternatively, the patterning step of the first metal nanowire layer 140A' can be performed by applying the exposure and developing processes to the composite film 20 of the first metal nanowire layer 140A' and the first photo-sensitive layer. Specifically, the composite film 20 is attached to the substrate 110, and then the above-mentioned exposure and developing processes are performed for patterning the structure to form the first touch sensing electrodes TE1 and the connecting electrodes CE. In other words, the first touch sensing electrodes TE1 and the connecting electrodes CE are both formed from the composite film 20 of the first metal nanowire layer 140A' and the first photo-sensitive layer.

Afterwards, the photo-sensitive layer 130 (the second photo-sensitive layer), the second metal nanowire layer 140A", and the photo-sensitive conductive layer 150 are formed on the substrate 110, and then the step for patterning the photo-sensitive layer 130, the second metal nanowire layer 140A", and the photo-sensitive conductive layer 150 is performed. In the above step, the manufacturing processes and the order of the manufacturing steps of the photo-sensitive layer 130, the second metal nanowire layer 140A", and the photo-sensitive conductive layer 150 can be referred to the above embodiments, so the following embodiment is described in brief only.

Specifically, the photo-sensitive layer 130 is formed on the substrate 110, and then the second metal nanowire layer 140A" is formed on the photo-sensitive layer 130. The photo-sensitive layer 130 and the second metal nanowire layer 140A" are mainly formed on the patterned first metal nanowire layer 140A' for forming the electrode structure corresponding to the first touch sensing electrodes TEL. Afterwards, the photo-sensitive conductive layer 150 is formed on the peripheral area PA. FIG. 13B shows the structure of the photo-sensitive layer 130, the second metal nanowire layer 140A", and the photo-sensitive conductive layer 150. The photo-sensitive conductive layer 150 is formed on the peripheral area PA located at the left side and the bottom side of the display area VA for forming the peripheral conductive traces 120 (e.g. the first and second axial peripheral conductive traces) corresponding to the signal transmissions for different axial sensing electrodes. Since the coating areas of the photo-sensitive layer 130 and the second metal nanowire layer 140A" are roughly the same, they are shown as a structure in the same layer. To be noted, the photo-sensitive conductive layer 150 and the patterned first metal nanowire layer 140A' (i.e. the first touch sensing electrode TE1 and/or the connecting electrode CE) have a cross or stacked structure for electrically connecting the following formed peripheral conductive traces 120 to the first touch sensing electrode TE1 and/or the connecting electrode CE and transmitting signals. Similarly, the photo-sensitive conductive layer 150 and the second metal nanowire layer 140A" also have a cross or stacked structure. That is, the second metal nanowire layer 140A" comprises a first part and a second part. The first part is located on the display area VA and is patterned to form the second axial electrode, and the second part is located on the peripheral area PA. The second part is covered by the photo-sensitive conductive layer 150, so that they can be conducted with each other after the patterning step.

Next, the patterning step of the photo-sensitive layer 130, the second metal nanowire layer 140A", and the photo-sensitive conductive layer 150 is performed. This patterning step can be referred to the above-mentioned exposure and developing processes, and the detailed description thereof will be omitted. FIG. 13C shows the patterned photo-sensitive layer 130, second metal nanowire layer 140A", and photo-sensitive conductive layer 150. The patterned photo-sensitive layer 130 and second metal nanowire layer 140A" can form the second touch sensing electrodes T2 and the bridge electrodes BR on the display area VA. The bridge electrode BR can cross the corresponding connecting electrode CE and connect the adjacent second touch sensing electrodes TE2 to form the second axial electrodes. In addition, the photo-sensitive conductive layer 150 can form the peripheral conductive traces 120, such as the first peripheral conductive trace and the second peripheral conductive trace located at the bottom side and the left side of the display area VA, which are electrically connected with the first axial electrode and the second axial electrode, respectively. The first touch sensing electrodes TE1 and the second touch sensing electrodes TE2 are structurally interlaced with each other, and they can together form the touch sensing electrode TE for sensing the touch or control gesture.

In one embodiment, the peripheral conductive traces 120 in different directions (e.g. the first peripheral conductive trace and the second peripheral conductive trace) and the second axial electrode can be formed by the same patterning process. Alternatively, the first photo-sensitive conductive layer is formed first, and it is patterned by the same exposure and developing step as the first metal nanowire layer 140A', thereby forming the above-mentioned first axial electrode and the first peripheral conductive trace. Afterwards, the second photo-sensitive conductive layer is formed, and it is patterned by the same exposure and developing step as the second metal nanowire layer 140A", thereby forming the above-mentioned second axial electrode and the second peripheral conductive trace.

In one embodiment, in order to prevent the interference of the exposure processes for the first and second photo-sensitive layers, the first and second photo-sensitive layers can have different photo sensitivities. In other words, the first and second photo sensitive layers are made of different materials that are sensitive to the lights of different wavelengths. As mentioned above, the objects to be patterned by the same exposure and developing process are made of the materials that are sensitive to the light source with the same wavelength.

Figure 14:
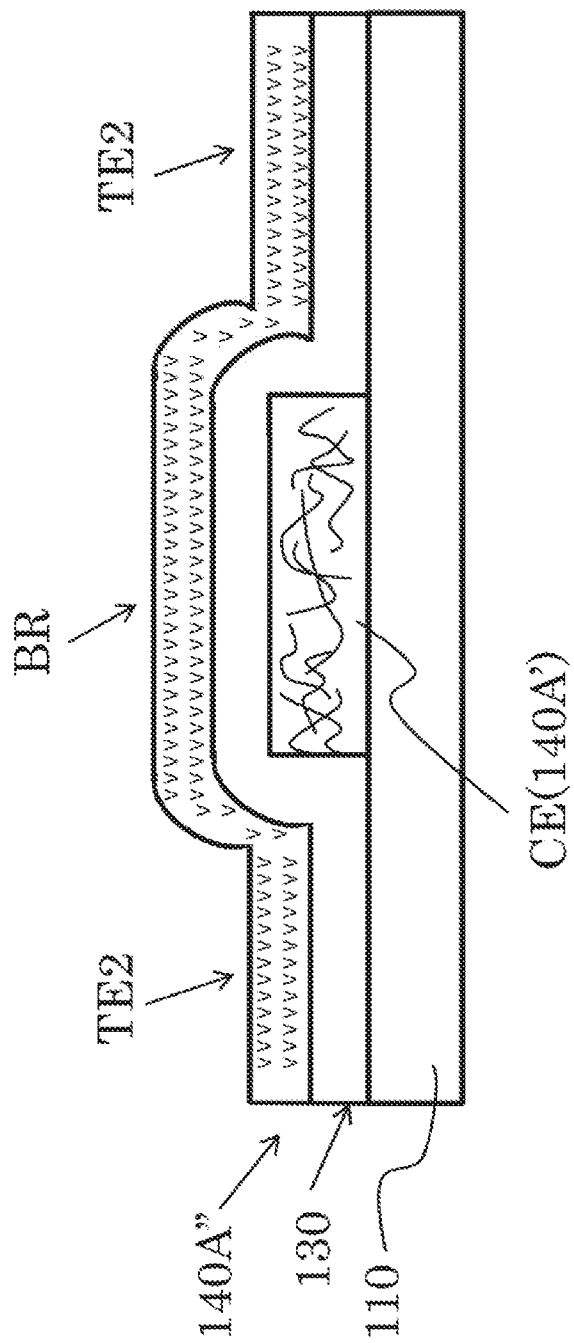
FIG. 14 is a sectional view of FIG. 13C along the line A-A.

FIG. 14 is a sectional view of FIG. 13C along the line A-A. The bridge electrode BR is a stacked structure of the photo-sensitive layer 130 and the second metal nanowire layer 140A", and the photo-sensitive layer 130, which has the insulation property, can form an insulation layer for electrically isolating the first metal nanowire layer 140A' and the second metal nanowire layer 140A". Thus, the signals of the dual axial electrode, which is made by the first metal nanowire layer 140A' and the second metal nanowire layer 140A", in the structure do not interfere with each other.

For example, the first touch sensing electrodes TE1 arranged along the first direction D1 can be used to transmit the external control signals, and the second touch sensing electrodes TE2 arranged along the second direction D2 can be used to transmit the touch sensing signals. In another embodiment, the connecting electrode CE can be a stacked structure of another photo-sensitive layer 130 (e.g. the first photo-sensitive layer) and the first metal nanowire layer 140A', so that the insulation layer can be formed by two photo-sensitive layers 130. In the above embodiment, a part of the photo-sensitive layer 130 (the thickness direction) is not added with the metal nanowires 140, so the photo-sensitive layer 130 can provide the insulation in the thickness direction for electrically isolating the first metal nanowire layer 140A' and the second metal nanowire layer 140A".

Figure 15:
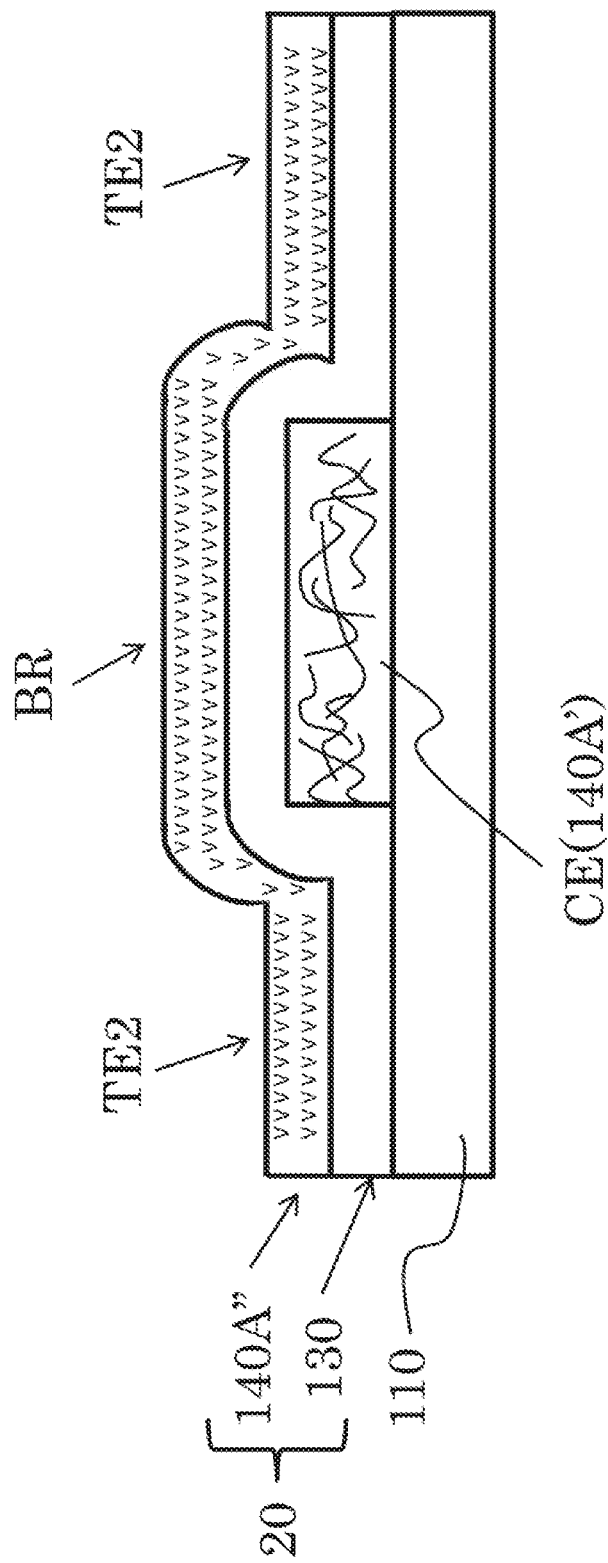
FIG. 15 is a sectional view of FIG. 13C along the line A-A according to another embodiment.

In another embodiment, as shown in FIG. 15, the composite film 20 of the second metal nanowire layer 140A" and the first photo-sensitive layer 130 is attached to the substrate 110, and then the photo-sensitive conductive layer 150 is formed by the above-mentioned method. Afterwards, the photo-sensitive conductive layer 150 is patterned by the above-mentioned exposure and developing processes to form the second touch sensing electrodes TE2, the bridge electrode BR, and the peripheral conductive traces 120. The manufacturing method can be referred to the above embodiments.

In order to protect the first touch sensing electrodes TE1 from the following processes, a basecoat (not shown) or an overcoat can be added to the first metal nanowire layer 140A'. For example, a polymer material can be coated on the first metal nanowire layer 140A', and the first metal nanowire layer 140A' can have a better mechanical property after the curing process.

In addition to the above-mentioned single-surface touch panel, the manufacturing method of this disclosure can also be applied to the double-surface touch panel. For example, the opposite sides of the substrate 110 are formed with a metal nanowire layer 140A and a photo-sensitive layer 130, and a photo-sensitive conductive layer 150 is formed on the opposite sides of the substrate 110. Next, the double-surface exposure and developing processes are performed to form the patterned touch sensing electrodes TE and the peripheral conductive traces 120 on the opposite sides of the substrate 110. Similar to the above embodiment, the steps of this disclosure can be integrated as one developing step for removing the parts of the photo-sensitive layers 130 and the metal nanowire layers 140A located in the removing areas 130B of the double-surface display areas VA of the substrate 110 to form the touch sensing electrodes TE, and simultaneously removing the parts of the photo-sensitive conductive layers 150, the photo-sensitive layers 130, and the metal nanowire layers 140A located in the removing areas 130B of the peripheral areas PA to form the peripheral conductive traces 120. In one embodiment, the first touch sensing electrodes TE1 and the second touch sensing electrodes TE2 are formed on the top surface and the bottom surface of the substrate 110, respectively, and they are structurally interlaced with each other, thereby forming the touch sensing electrode TE for sensing the touch or control gesture.

In one embodiment, in order to prevent the interference of the exposure processes for the photo-sensitive layers 130 and the photo-sensitive conductive layers 150 located on opposite sides of the substrate 110, the light sources with different time sequences are provided for the exposure processes.

The above embodiments can be applied to one another based on the actual situation.

In some embodiments of this disclosure, when performing the patterning step of the photo-sensitive layers 130 or the photo-sensitive conductive layers 150 without the etching agent (i.e. the exposure and developing process), the transparent conductive layer comprising the metal nanowire layer 140A and the photo-sensitive layers 130 is simultaneously patterned to form the touch sensing electrodes TE on the display area, so that the conventional etching step for etching the metal nanowire layer 140A by the etching agent is not needed. Accordingly, the problem caused by the residual etching agent can be solved, thereby increasing the production yield.

In some embodiments of this disclosure, the metal nanowire layer 140A is not etched by the etching agent, so that the influence of components (e.g. the peripheral conductive traces 120 made by the metal material) caused by the etching agent can be eliminated.

In some embodiments of this disclosure, due to the photo sensitivity of the photo-sensitive layer 130 and/or the photo-sensitive conductive layer 150, the metal nanowire layer 140A can be patterned by the developer solution after the light chemical reaction of the photo sensitivity of the photo-sensitive layer 130 and/or the photo-sensitive conductive layer 150. Thus, the conventional step for etching the metal nanowire layer 140A is not needed, thereby simplifying the entire manufacturing process and thus decreasing the manufacturing cost.

In some embodiments of this disclosure, the photo-sensitive conductive layer 150 is in direct contact with the metal nanowires 140 in the metal nanowire layer 140A, so that the low impedance conductive wire can be formed, thereby decreasing the loss and distortion of the transmitted touch control signals.

In some embodiments of this disclosure, the photo-sensitive layer 130 can provide the protection to the metal nanowire layer 140A, so that the product can pass the stricter environmental resistance test.

In some embodiments of this disclosure, the photo-sensitive layer 130 can function as a protection layer for increasing the durability of the touch sensing electrodes on the display area.

In some embodiments of this disclosure, the peripheral conductive traces and the metal nanowire layer thereunder are designed to be patterned by the same patterning step, so that the alignment step can be removed. Thus, the preserved tolerance space for the alignment process is not needed, so the width of the peripheral area can be decreased.

In some embodiments of this disclosure, the manufacturing method of this disclosure can be applied to process a large amount of single-surface or double-surface touch panels in a batch.

Although the disclosure has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the disclosure.

What is claimed is:
1. A manufacturing method for a touch panel, comprising:
providing a substrate, wherein the substrate comprises a display area and a peripheral area;
forming a patterned photo-sensitive conductive layer on the peripheral area;
forming a metal nanowire layer on the display area and the peripheral area, wherein the metal nanowire layer comprises metal nanowires, and a part of the metal nanowire layer covers the patterned photo-sensitive conductive layer;

forming a photo-sensitive layer on the metal nanowire layer, wherein the photo-sensitive layer and the patterned photo-sensitive conductive layer are made of materials with same bandwidth absorption characteristics; and performing a patterning process comprising:

providing a light source for simultaneously exposing the photo-sensitive layer and the patterned photo-sensitive conductive layer to define a first removing area and a second removing area; and removing the photo-sensitive layer and the metal nanowire layer in the first removing area by a developer solution so as to form a touch sensing electrode on the display area and simultaneously removing the patterned photo-sensitive conductive layer, the photo-sensitive layer, and the metal nanowire layer in the second removing area by the developer solution so as to form a peripheral conductive trace on the peripheral area, wherein the touch sensing electrode is electrically connected with the peripheral conductive trace, and the touch sensing electrode at least comprises the metal nanowires.

2. The manufacturing method of claim 1, wherein the patterned photo-sensitive conductive layer comprises a negative photo-sensitive silver paste.

3. The manufacturing method of claim 2, further comprising curing the negative photo-sensitive silver paste.

4. The manufacturing method of claim 1, further comprising, after performing the patterning process, completely removing the metal nanowires in the first removing area or the second removing area by an adhesion method.

5. The manufacturing method of claim 1, wherein a thickness of the photo-sensitive layer is selected to at least cover the metal nanowires.

6. The manufacturing method of claim 1, wherein forming the metal nanowire layer on the display area and the peripheral area and forming the photo-sensitive layer on the metal nanowire layer comprise:

attaching a composite film at least comprising the photo-sensitive layer and the metal nanowire layer to the substrate.

7. A manufacturing method for a touch panel, comprising:

providing a substrate, wherein the substrate comprises a display area and a peripheral area, and a first axial electrode is configured on the display area;

forming a photo-sensitive layer, a metal nanowire layer comprising metal nanowires, and a photo-sensitive conductive layer on the substrate, wherein the photo-sensitive layer and the photo-sensitive conductive layer are made of materials with same bandwidth absorption characteristics; and performing a patterning process comprising:

providing a light source for simultaneously exposing the photo-sensitive layer and the photo-sensitive conductive layer to define a first removing area and a second removing area; and removing the photo-sensitive layer and the metal nanowire layer in the first removing area by a developer solution so as to form a second axial electrode on the display area and simultaneously removing the photo-sensitive conductive layer, the photo-sensitive layer, and the metal nanowire layer in the second removing area by the developer solution so as to form a peripheral conductive trace on the peripheral area, wherein the first axial electrode and the second axial electrode are isolated from each other, the first axial electrode and the second axial electrode are electrically connected with the peripheral conductive trace, and the first axial electrode and the second axial electrode at least comprise the metal nanowires.

8. The manufacturing method of claim 7, wherein forming the photo-sensitive layer, the metal nanowire layer comprising the metal nanowires, and the photo-sensitive conductive layer on the substrate comprises:

forming the photo-sensitive layer on the substrate;

forming the metal nanowire layer on the photo-sensitive layer, wherein a first part of the metal nanowire layer is located on the display area, and a second part of the metal nanowire layer is located on the peripheral area; and forming the photo-sensitive conductive layer on the peripheral area, wherein the photo-sensitive conductive layer covers the second part.

9. The manufacturing method of claim 7, wherein the photo-sensitive conductive layer comprises a negative photo-sensitive silver paste.

10. The manufacturing method of claim 9, further comprising curing the negative photo-sensitive silver paste.

11. The manufacturing method of claim 7, further comprising, after performing the patterning process, removing the metal nanowires in the first removing area or the second removing area by an adhesion method.

12. The manufacturing method of claim 7, wherein a thickness of the photo-sensitive layer is selected to at least cover the metal nanowires.

13. The manufacturing method of claim 7, wherein forming the photo-sensitive layer, the metal nanowire layer comprising the metal nanowires, and the photo-sensitive conductive layer on the substrate comprises:

attaching a composite film at least comprising the photo-sensitive layer and the metal nanowire layer to the substrate; and forming the photo-sensitive conductive layer on the peripheral area.

14. A touch panel, comprising: a substrate, wherein the substrate comprises a display area and a peripheral area;

a first axial electrode disposed on the display area, wherein the first axial electrode comprises a photo-sensitive layer and a metal nanowire layer disposed on the substrate; and a photo-sensitive conductive layer disposed on the peripheral area, wherein the photo-sensitive layer and the photo-sensitive conductive layer are made of materials with same bandwidth absorption characteristics, the photo-sensitive layer and the photo-sensitive conductive layer are simultaneously exposed by a light source to define a first removing area and a second removing area, the photo-sensitive layer and the metal nanowire layer in the first removing area are removed by a developer solution so as to form a second axial electrode on the display area, the photo-sensitive conductive layer, the photo-sensitive layer, and the metal nanowire layer in the second removing area are removed by the developer solution so as to form a peripheral conductive trace on the peripheral area, the first axial electrode and the second axial electrode are isolated from each other, the first axial electrode and the second axial electrode are electrically connected with the peripheral conductive trace, and the first axial electrode and the second axial electrode at least comprise metal nanowires.

15. The touch panel of claim 14, wherein the metal nanowire layer comprises the metal nanowires, the metal nanowires are embedded in the photo-sensitive layer to form a conductive network, and the photo-sensitive layer and the metal nanowires located on the display area together form the second axial electrode.

16. The touch panel of claim 15, wherein the metal nanowires are embedded in the photo-sensitive layer to form a composite structure.

17. The touch panel of claim 15, wherein a thickness of the photo-sensitive layer is configured to at least cover the metal nanowires.

18. The touch panel of claim 15, wherein a portion of the metal nanowires protrude from the photo-sensitive layer, and the peripheral conductive trace contacts the portion of the metal nanowires protruding from the photo-sensitive layer.

19. The touch panel of claim 16, wherein the photo-sensitive layer and the metal nanowire layer are integrated to form a composite film.

20. The touch panel of claim 16, wherein the photo-sensitive layer forms an isolation layer between the first axial electrode and the second axial electrode.

21. The touch panel of claim 20, wherein the first axial electrode comprises a connecting electrode, the second axial electrode comprises a bridging electrode, and the photo-sensitive layer forms an isolation layer between the connecting electrode and the bridging electrode.

22. The touch panel of claim 14, wherein the photo-sensitive conductive layer comprises a negative photo-sensitive silver paste.

\* \* \* \* \*